United States Patent
Sommer et al.

(10) Patent No.: US 7,295,365 B2
(45) Date of Patent: Nov. 13, 2007

(54) OPTICAL GAIN FLATTENING COMPONENTS, OPTICAL CHIPS AND OPTICAL AMPLIFIERS AND METHODS EMPLOYING SAME

(75) Inventors: Rad Sommer, Sebastopol, CA (US); Michael A. Scobey, Santa Rosa, CA (US); Barrie Flintham, Halwell (GB); Rance Morgan Fortenberry, Cazadero, CA (US); Paul Johnson, Torquay (GB)

(73) Assignee: Bookham Technology plc., Caswell, Towcester, Northamptonshire (GB)

( * ) Notice: Subject to any disclaimer, the term of this patent is extended or adjusted under 35 U.S.C. 154(b) by 0 days.

(21) Appl. No.: 11/248,826

(22) Filed: Oct. 12, 2005

(65) Prior Publication Data

US 2007/0081226 A1    Apr. 12, 2007

Related U.S. Application Data

(60) Provisional application No. 60/724,180, filed on Oct. 6, 2005.

(51) Int. Cl.
*H01S 3/00* (2006.01)
(52) U.S. Cl. .................................. 359/341.32
(58) Field of Classification Search ............ 359/341.32
See application file for complete search history.

(56) References Cited

U.S. PATENT DOCUMENTS 4,910,727 A * 3/1990 Fussganger ................ 398/139

(Continued)

FOREIGN PATENT DOCUMENTS

EP           0856764 A2      8/1998

(Continued)

OTHER PUBLICATIONS

International Search Report for PCT/GB2006/050306.

*Primary Examiner*—Deandra M Hughes
(74) *Attorney, Agent, or Firm*—Banner & Witcoff, Ltd

(57) ABSTRACT

An optical component for gain-flattening multiplexed passband signals amplified with optical pump power, comprises a launch port optical waveguide operative to communicate multiplexed passband signals in a passband wavelength range and optical pump power in a different wavelength range; a thin film demux filter oriented to receive combined multiplexed passband signals and optical pump power from the launch port optical waveguide, and operative to pass the multiplexed passband signals and to reflect the optical pump power; a bypass port optical waveguide operative and oriented to receive and carry optical pump power reflected by the demux filter; a gain-flattening filter positioned to receive from the thin film demux filter and operative to pass the multiplexed passband signals with a desired attenuation profile for gain-flattening; and an output port optical waveguide oriented to receive and operative to carry at least multiplexed passband signals passed by the gain-flattening filter. Also disclosed are optical amplifiers comprising such GFF components. Also disclosed are optical filters comprising an optical substrate, a thin film demux filter on a first surface of the optical substrate, and a gain-flattening filter on an opposite surface of the optical substrate, wherein the demux filter is operative to pass multiplexed passband signals in a passband wavelength range and to reflect optical pump power in a different wavelength range, and the gain-flattening filter is operative to pass the multiplexed passband signals and to provide a desired attenuation profile to the multiplexed passband signals.

29 Claims, 13 Drawing Sheets

U.S. PATENT DOCUMENTS

| | | | |
|---|---|---|---|
| 5,434,701 A * | 7/1995 | Fatehi et al. | 359/341.4 |
| 5,623,508 A * | 4/1997 | Grubb et al. | 372/3 |
| 5,657,155 A * | 8/1997 | Cheng | 359/341.1 |
| 5,748,363 A * | 5/1998 | Duck et al. | 359/341.1 |
| 5,801,879 A * | 9/1998 | Burton et al. | 359/341.2 |
| 5,880,875 A * | 3/1999 | Kim | 359/341.3 |
| 5,892,781 A * | 4/1999 | Pan et al. | 372/6 |
| 5,917,635 A * | 6/1999 | Cvijetic et al. | 398/147 |
| 6,172,802 B1 * | 1/2001 | d'Auria et al. | 359/341.2 |
| 6,433,924 B1 * | 8/2002 | Sommer | 359/337.1 |
| 6,529,326 B2 | 3/2003 | Cai | |
| 6,529,328 B1 * | 3/2003 | Cheng et al. | 359/578 |
| 6,546,168 B1 * | 4/2003 | Xie et al. | 385/39 |
| 7,006,280 B2 | 2/2006 | Huang et al. | |
| 2003/0002839 A1 * | 1/2003 | Clow et al. | 385/136 |
| 2003/0067645 A1 | 4/2003 | Ibsen et al. | |
| 2004/0165819 A1 | 8/2004 | Yinglin et al. | |

FOREIGN PATENT DOCUMENTS

| | | |
|---|---|---|
| GB | 2386780 A | 9/2003 |
| GB | 2391952 A | 2/2004 |

* cited by examiner

OPTICAL GAIN FLATTENING COMPONENTS, OPTICAL CHIPS AND OPTICAL AMPLIFIERS AND METHODS EMPLOYING SAME

CROSS-REFERENCED APPLICATIONS AND PRIORITY CLAIM

This application claims the benefit of now abandoned U.S. Provisional Application No. 60/724,180 filed on Oct. 6, 2005.

PRIORITY

This application claims priority benefit of U.S. Provisional patent application Ser. No. 60/724,180 filed on Oct. 6, 2005, entitled "Optical Gain-Flattening Components, Optical Chips and Optical Amplifiers and Methods Employing Same."

INTRODUCTION

The present invention relates to certain improved gain-flattening components employing thin film mux and demux filters and gain-flattening filters (GFFs). The present invention also relates to certain improved optical amplifiers employing such gain-flattening components, including optical amplifiers suitable for use in optical systems such as telecommunication systems or other systems employing multiplexed optical signals and requiring gain-flattening, such as to compensate for uneven amplification of the multiplexed signals. The present invention also relates to certain filter-coated optical chips suitable for use in certain of such GFF components. The present invention also relates to certain improved methods of producing and using such optical chips, GFF components and optical amplifiers.

BACKGROUND

Optical systems are known for carrying multiplexed optical signal channels via optical fibers and associated optical devices. In some cases such systems are known to employ optical amplifiers to batch-amplify the multiplexed signals being carried by the system, i.e., to amplify simultaneously all of the different signal channels within the wavelength range of the passband, such as the C-band, L-band, S-band, etc. Commercially employed optical amplifiers, such as doped optical fiber amplifiers, typically provide an uneven level of gain across the passband. Erbium-doped fiber amplifiers (EDFAs) operating in the C-band (generally about 1525 nm to 1575 nm), for example, produce a well known two-peaked spectral gain profile. It is known, therefore, to employ gain-flattened amplifiers, such as gain-flattened optical fiber amplifiers or other gain-flattened optical amplifiers.

It is known, for example to employ a dielectric thin-film gain-flattening filter with an optical amplifier, e.g., with an EDFA or other doped fiber amplifier, to construct a gain-flattened amplifier. Thin-film gain-flattening filters have advantageous properties, including low insertion loss, small size, economical design and manufacturing costs, acceptable environmental stability, etc. As a result, the spectrum of optical signals passing through the one or more gain stages of the amplifier and the gain-flattening filter (in some cases referred to here, for convenience, as a GFF) in combination can achieve more uniform amplification, i.e., nearly flat gain. In known optical amplifiers of this type, it is common to employ a pump laser as a source of optical power for amplification, i.e., optical power in suitable pump wavelength(s), alternatively referred to as optical pump energy, to provide optical gain to the optical input signals. The amplification wavelengths are multiplexed with the optical input signals passed to the doped optical fiber of the amplifier at a suitable multiplexer (or "mux"), e.g., a fused fiber mux (or "s-mux") or the like. Typically, an optical amplifier of this type will have more than one gain stage, e.g., multiple coils of erbium doped optical fiber arranged serially along the optical path through the amplifier. In order to have optical pump energy for each of the gain stages, a corresponding number of pump lasers can be used. Alternatively, it has been known to use the amplification wavelengths from a single pump laser in each of multiple gain stages. Because the amplification wavelengths would not suitably pass through a typical GFF positioned between gain stages, it has been known to employ a fused fiber demux to remove the amplification wavelengths from the signal wavelengths after the first gain stage. Downstream of the GFF the amplification wavelengths are multiplexed back into the optical pathway with the signal wavelengths for the subsequent gain stage.

There is increasing need to provide improved optical amplifiers. Also, there is a substantial need to decrease the cost, weight and/or complexity of optical components, including optical amplifiers, especially those used in telecommunication systems and the like. Accordingly, it is an object of one aspect of the present invention to provide improved optical amplifiers that address one or more of those existing needs. In accordance with certain exemplary embodiments, it is an object to provide optical amplifiers that are more economical to produce, more compact and/or lighter or smaller than known optical amplifiers. It is an object of another aspect of the present invention to provide improved gain-flattening components, including gain-flattening components suitable for use in such optical amplifiers. It is an object of another aspect of the present invention to provide improved filter-coated optical chips, including optical chips suitable for use in such gain-flattening components. It is an object of another aspect of the present invention to provide improved methods of making and using such optical amplifiers, GFF components, and optical chips. Additional objects and advantages of the present invention will be apparent from the following disclosure and from the detailed description of certain exemplary embodiments.

SUMMARY

In accordance with one aspect, an optical component for gain-flattening multiplexed passband signals in a passband wavelength range, which signals have been amplified with optical pump power in a different wavelength range, comprises a launch port optical waveguide, a thin film demux filter, a pump power optical waveguide, a gain-flattening filter (or GFF), and an output port optical waveguide. In some cases an optical component in accordance with this disclosure is referred to below as a GFF component (and should not be confused with the just mentioned gain-flattening filter sub-component it incorporates). The launch port optical waveguide, the pump power optical waveguide and the output port optical waveguide each can be an optical fiber or other suitable waveguide. In accordance with another aspect, optical amplifiers comprise at least one such optical component for gain-flattening amplified multiplexed passband signals. In certain embodiments of the optical amplifiers in accordance with this disclosure, the optical pump power is communicated by the launch port optical waveguide to the demux filter from a gain stage, such as an EDFA, along with multiplexed passband signals amplified by such gain stage. In such embodiments the optical pump power is multiplexed with the passband signals prior to the gain stage and is communicated by the launch port optical waveguide to the demux filter where it is reflected to the pump power optical waveguide to bypass the GFF sub-component. The demux filter also is operative to pass the multiplexed passband signals to the GFF sub-component for gain-flattening.

In certain other embodiments of the optical amplifiers in accordance with this disclosure, the optical pump power may be up-communicated by the launch port optical waveguide, i.e., passed from the demux filter to launch port optical waveguide and carried by the launch port optical waveguide to a gain stage in which the multiplexed passband signals are amplified prior to being processed for gain-flattening by the GFF component. For example, in certain embodiments discussed in more detail below, optical pump power is communicated to the demux filter by the pump power optical waveguide from a pump laser or other source of optical power suitable for amplification of the passband signals, and reflected by the demux filter into the launch port optical waveguide. The launch port optical waveguide is operative in these embodiments to communicate the multiplexed passband signals and optical pump power in a different wavelength range between the demux filter and a first gain stage of the amplifier, e.g., an EDFA or the like. Thus, the thin film demux filter is oriented and operative in these embodiments (i) to receive multiplexed passband signals from the launch port optical waveguide and to pass such signals to the GFF sub-component, and (ii) to receive optical pump power from the pump power optical waveguide and to reflect such pump power to the launch port optical waveguide to be carried to the gain stage from which the amplified signals are being received. The pump power optical waveguide is operative and oriented in such embodiments to communicate optical pump power to the demux filter to be reflected by the demux filter to the launch port optical waveguide.

The gain-flattening filter of the GFF optical components disclosed here is positioned to receive and operative to pass multiplexed passband signals in the passband wavelength range with a desired attenuation profile for gain-flattening. The attenuation profile can compensate for uneven amplification of different channels of the multiplexed signals, e.g., it can compensate for one or both gain stages in a two stage amplifier. In certain embodiments the GFF can provide an attenuation profile suitable to compensate for the combined effects of uneven amplification by two, three or more gain stages as well as the effects of other components and sub-components of an optical amplifier. The output port optical waveguide is oriented to receive at least multiplexed passband signals passed by the gain-flattening filter. In certain embodiments of the optical amplifiers disclosed here, optical pump power used in a gain stage is communicated by the pump power optical waveguide to the output port optical waveguide to bypass the GFF sub-component and be carried to a subsequent gain stage, e.g., a second gain stage of the amplifier. In certain such embodiments optical pump power from a first gain stage is carried to the demux filter by the launch port optical waveguide and reflected by the demux filter to the pump power optical waveguide to bypass the GFF sub-component, as discussed above. The optical pump power can then be recombined with the multiplexed optical signals passed by the GFF for further amplification of the signals at a second gain stage by multiplexing the pump power optical waveguide (or by a subsequent waveguide, e.g., an optical fiber with which the pump power optical waveguide is spliced or otherwise multiplexed) at a mux/demux positioned along the output port optical waveguide beyond the GFF optical component. In certain other such embodiments such optical pump power from a first gain stage, carried to the demux filter by the launch port optical waveguide and reflected by the demux filter to the pump power optical waveguide to bypass the GFF sub-component, can be recombined with the multiplexed optical signals (passed by the GFF sub-component) by a reflector filter (acting as a mux/demux) at an output end of the GFF component. Optical pump power in such embodiments is fed or launched by the pump power optical waveguide (or by a subsequent waveguide, e.g., an optical fiber to which the pump power optical waveguide has been spliced or otherwise multiplexed) to such reflector filter of the GFF component to be reflected there into the output port optical waveguide to be carried to a second or subsequent gain stage of the amplifier with the multiplexed signals.

In certain other embodiments of the optical amplifiers disclosed here, optical pump power for a subsequent gain stage is fed from a pump laser or other source separately to both a first and second gain stage via the input end and the output end of the GFF component. In such center pumped embodiments, a first pump power optical waveguide communicates optical pump power from the pump laser or other source to the demux filter to be reflected into the launch port optical waveguide to be up-communicated to a first gain stage. A second pump power optical waveguide communicates optical pump power from the pump laser or other source to a reflector at an output end of the GFF component (i.e., to a point beyond the GFF sub-component) to be reflected into the output port optical waveguide to be carried to a second or subsequent gain stage of the amplifier with the multiplexed signals. In certain other such embodiments such optical pump power is recombined with the multiplexed optical signals passed by the GFF at a mux/demux positioned along the output port optical waveguide (or along a subsequent waveguide, e.g., an optical fiber to which the output port optical waveguide has been spliced or otherwise multiplexed) beyond the GFF optical component.

In accordance with another aspect, an optical component for gain-flattening multiplexed passband signals amplified with optical pump power comprises a launch port optical waveguide, a thin film demux filter, a bypass port optical waveguide, a gain-flattening filter and an output port optical waveguide. As noted above, the optical components disclosed here are in some cases, for convenience, referred to as GFF components or GFF optical components. The launch port optical waveguide, the bypass port optical waveguide and the output port optical waveguide each can be an optical fiber or other suitable waveguide. In certain exemplary embodiments, the launch port optical waveguide and the bypass port optical waveguide are together held in a dual fiber ferrule fitted to a housing in which both the thin film demux filter and the gain-flattening filter are mounted. The launch port optical waveguide of the GFF components disclosed here is operative to communicate multiplexed passband signals in a passband wavelength range and optical pump power in a different wavelength range. The thin film demux filter is oriented to receive combined multiplexed passband signals and optical pump power from the launch port optical waveguide, and is operative to pass the multiplexed passband signals and to reflect the optical pump power. For example, in certain embodiments the thin film demux filter is operative to pass multiplexed passband signals in the C-band, L-band, S-band, other communication band or a combination of communication bands and to reflect optical pump power, e.g., pump power of nominal 980 nm wavelengths. The bypass port optical waveguide is operative and oriented to receive and carry optical pump power reflected by the demux filter. In certain such embodiments the bypass port optical waveguide is operative to attenuate signals in the passband wavelength range, whereby the strength of signals in the passband is further reduced. The gain-flattening filter is positioned to receive the multiplexed passband signals passed by the thin film demux filter and is operative to pass the multiplexed passband signals with a desired attenuation profile for gain-flattening. The output port optical waveguide is oriented to receive and operative to carry at least multiplexed passband signals passed by the gain-flattening filter. In certain embodiments the output port optical waveguide also is oriented to receive and operative to carry optical pump power.

A GFF component in accordance with this disclosure can be employed in or with an optical amplifier, e.g., being positioned between multiple gain stages, such as between first and second EDFA coils. The GFF component may itself comprise such gain stages, e.g., in a common housing with the gain-flattening filter and other sub-components of the GFF component. In certain 4-port embodiments discussed in more detail below, optical pump power reflected by the thin film demux filter is carried by the bypass port optical waveguide to an output surface of the GFF component, which output surface is reflective of the optical pump power such that the optical pump power is reflected into the output port optical waveguide and so recombined with the gain-flattened multiplexed passband signals passed by the gain-flattening filter. The re-combined multiplexed passband signals and optical pump power can be carried to a gain stage for further amplification. In certain 3-port embodiments discussed in more detail below, optical pump power reflected by the thin film demux filter to the bypass port optical waveguide is carried to a multiplexer beyond or (optically "downstream") of the GFF component, e.g., a fiber splice multiplexer (s-mux) or the like, to be recombined with the gain-flattened multiplexed passband signals passed by the gain-flattening filter. It should be understood that optical "upstream" and "downstream" directional reference are used for convenience and can be understood with reference to the appended drawings wherein, in all cases, upstream refers to the left side or toward the left side of the GFF components and amplifiers depicted, and downstream is the right side or toward the right of the GFF components and amplifiers depicted.

Certain embodiments of the optical components disclosed here for gain-flattening multiplexed passband signals amplified with optical pump power, further comprise other sub-components, such as lenses, ferrules, collimators and the like. In certain exemplary embodiments a first lens is positioned and operative to focus combined multiplexed passband signals and optical pump power from the launch port optical waveguide to the demux filter and to focus optical pump power reflected by the thin film demux filter to the bypass port optical waveguide. In certain exemplary embodiments a second lens is positioned and operative to focus multiplexed passband signals passed by the gain-flattening filter to the output port optical waveguide. For example, the first lens can be positioned between the launch port optical waveguide and the thin film demux filter, and the second lens can be positioned between the gain-flattening filter and the output port optical waveguide. The lenses each can be a ball lens, GRIN lens, aspheric lens or other suitable lens.

In certain exemplary embodiments of the GFF components and optical amplifiers disclosed here, optical surfaces (i.e., surfaces that receive and pass or reflect passband signals or optical pump power) along the light path in the GFF component are non-orthogonal to the direction of the light beam (i.e., the axial direction of the beam). Likewise, facing optical surfaces of certain exemplary embodiments of the GFF components and optical amplifiers disclosed here are non-parallel to each other. In particular, for example, the surface of the optical chip carrying the thin film demux filter in certain exemplary embodiments is non-parallel to the end-surface of the launch port optical waveguide and the end surface of the bypass port optical waveguide, and the surface of the optical chip carrying the gain-flattening filter or other output surface of the GFF component facing the output port optical waveguide is non-parallel to the end-surface of the output port optical waveguide. More generally, the filter surface or other coated surface of an optical substrate chip used in the GFF component facing an optical fiber or other waveguide can be oriented so as to be non-orthogonal to the axial direction of the optical beam. Optional and additional features of the GFF optical components disclosed here will be apparent to those skilled in the art from the discussion below.

In accordance with another aspect, an optical amplifier is provided for amplifying multiplexed passband signals with optical pump power. The optical amplifiers according to this aspect comprise:
  a first gain stage operative to receive multiplexed passband signals in a passband wavelength range combined with optical pump power in a different wavelength range and to amplify and pass the multiplexed passband signals combined with optical pump power;
  an optical gain-flattening component in accordance with the foregoing disclosure, operative to receive from the first gain stage amplified multiplexed passband signals combined with optical pump power and to provide a desired attenuation profile to the multiplexed passband signals for gain-flattening; and
  a second gain stage operative to receive the multiplexed passband signals from the optical component and optical pump power to further amplify the multiplexed passband signals, the attenuation profile provided by the optical gain-flattening component compensating for uneven amplification of the first and second gain stages.

Optionally the optical amplifier further comprises an isolator between the optical gain-flattening component and the second gain stage, and/or an isolator following the second gain stage. The first and second gain stage, in certain exemplary embodiments, each comprises a doped fiber gain stage, e.g., an erbium-doped fiber amplifier (EDFA) or other suitable gain stage. In certain exemplary embodiments the optical gain-flattening component(s) employed in the optical amplifier disclosed here comprises a launch port optical waveguide, a thin film demux filter, a pump power optical waveguide, a gain-flattening filter, and an output port optical waveguide. In certain exemplary embodiments the optical gain-flattening component(s) comprises:
  a launch port optical waveguide operative to carry the multiplexed passband signals and the optical pump power;
  a thin film demux filter oriented to receive the combined multiplexed passband signals and optical pump power from the launch port optical waveguide, and operative to pass the multiplexed passband signals and to reflect the optical pump power;

a bypass port optical waveguide operative and oriented to receive and carry the optical pump power reflected by the demux filter;

a gain-flattening filter positioned to receive and operative to pass multiplexed passband signals in the passband wavelength range with a desired attenuation profile for gain-flattening; and an output port optical waveguide oriented to receive at least multiplexed passband signals passed by the gain-flattening filter and operative to pass them to the second gain stage.

Certain exemplary embodiments of the optical amplifiers disclosed here for amplifying multiplexed passband signals further comprise a source of optical pump power, e.g., a pump laser or other suitable source of power signals. Optional and additional features of the optical amplifiers disclosed here will be apparent to those skilled in the art from the discussion below.

In accordance with another aspect, an optical filter comprises an optical substrate, a thin film demux filter on a first surface of the optical substrate, and a gain-flattening filter on an opposite surface of the optical substrate, wherein the demux filter is operative to pass multiplexed passband signals in a passband wavelength range and to reflect optical pump power in a different wavelength range, and the gain-flattening filter is operative to pass the multiplexed passband signals and to provide a desired attenuation profile to the multiplexed passband signals. As discussed further below, optical filters in accordance with this disclosure can be used as sub-components in various embodiments of the GFF components and optical amplifiers disclosed above. For example, the gain-flattening filter may be operative to provide a desired or predetermined attenuation profile to multiplexed passband signals in the C-band, L-band, S-band or other communication band, and the demux filter may be operative to pass such multiplexed passband signals and to reflect pump power such as nominal 980 nm wavelength signals or other pump power wavelength range different from the wavelength range of the passband. In certain exemplary embodiments the optical filters employ an optical substrate which is wedged. That is, for example, in certain exemplary embodiments of the optical filters disclosed immediately above, the surface carrying the thin film demux filter and the opposite surface carrying the gain-flattening filter are not parallel to each other, e.g., they may be non-parallel to each other at an angle of up to 1° or more, such as 0.25°. In addition, in certain exemplary embodiments the optical surfaces are non-orthogonal to the direction (such as the intended direction) of the light beam passing through the optical filter. Optional and additional features of the optical filters disclosed here will be apparent to those skilled in the art from the discussion below.

It will be recognized by those skilled in the art, given the benefit of this disclosure, that there are numerous alternative embodiments of optical amplifiers in accordance with the principles of the present invention. Various especially preferred embodiments have advantageous use in fiber optic telecommunication systems or other optical signal systems. Additional features and advantages of various exemplary embodiments will be apparent from the following disclosure.

DETAILED DESCRIPTION OF CERTAIN EXEMPLARY EMBODIMENTS

Figure 1:
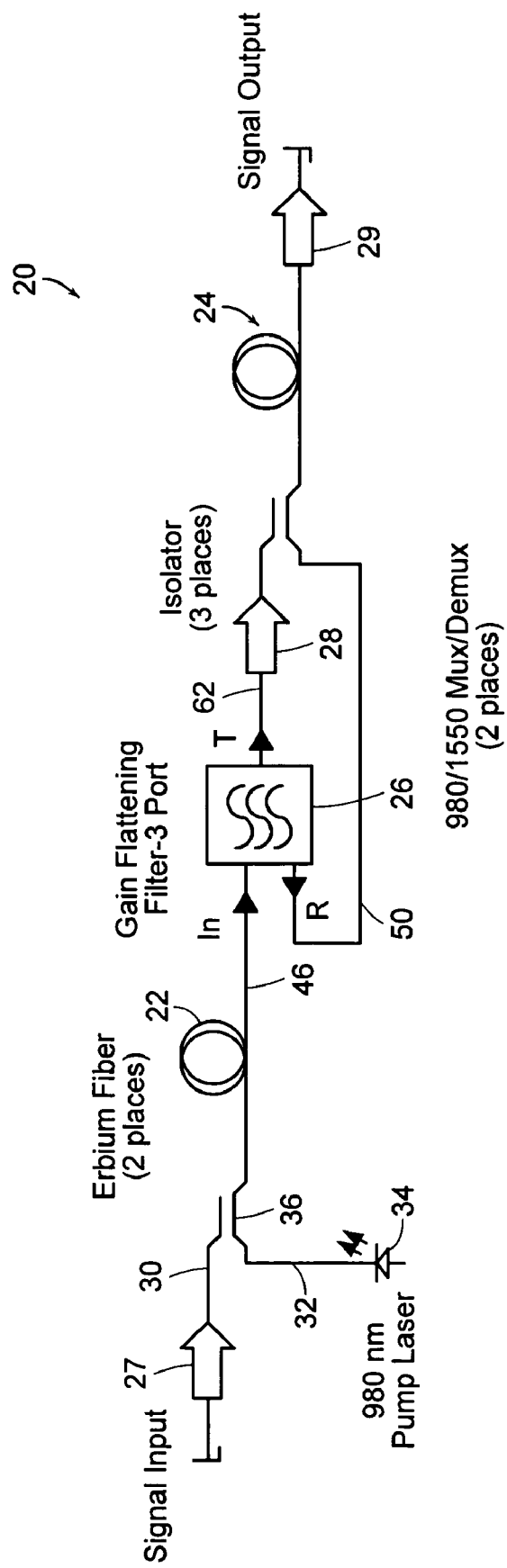
FIG. 1 is a schematic view of one embodiment of a multi-gain stage optical amplifier in accordance with the present invention, comprising a GFF component in accordance with one embodiment of that aspect of the invention.

The following discussion of certain exemplary embodiments of the invention focuses primarily on multiplexed optical signal systems, such as telecommunication systems and the like. Certain suitable embodiments of the gain-flattened optical amplifiers disclosed here, however, are applicable generally to optical systems. In certain of the embodiments disclosed here, for convenience of discussion, the amplifier is designed for dense wavelength division multiplexed telecommunications systems operating in the C-band and employing EDFA amplifiers. However, it will be readily apparent to those skilled in the art, given the benefit of this disclosure, that optical amplifiers in accordance with the principles disclosed here have application within the scope of the invention to other systems, including telecommunications systems operating in other wavelength bands and using other components, and to other optical systems calling for gain-flattened optical gain. Thus, in accordance with certain exemplary embodiments of the gain-flattened optical signal amplifiers disclosed here, the optical signal amplifier is a doped optical fiber amplifier such as, e.g., an erbium-doped optical fiber amplifier where the optical signal wavelength range is the C-band. Doped optical fiber amplifiers in accordance with other embodiments of these amplifiers may be used where the optical signal wavelength range is in the L-band, S-band or other band. Also, optical amplifiers in accordance with certain exemplary embodiments can be used to amplify signals in any combination of such bands and/or other wavelength ranges.

As used here and in the appended claims, optical elements of an optical amplifier (or of a sub-assembly of an optical amplifier) in accordance with the present disclosure, e.g., optical components or features such as a gain-flattening filter, a spool of erbium doped fiber, an isolator, a fused fiber mux or other multiplexer, a collimator, etc., are "in optical series" along an optical pathway when they are optically coupled to one another so that one can pass optical signals to the other or receive optical signals passed by the other. Components are in optical series with one another along the optical pathway of the amplifier when they are optically coupled to each other so as to be operative to pass or propagate optical signals from one to the other (directly or indirectly) along the optical pathway traveled by the optical signals through the amplifier. Optical elements are in optical series with one another, e.g., between the input port and the output port of an optical amplifier in accordance with the present disclosure, regardless whether they are upstream or downstream of one another along the optical pathway. Optical elements are optically coupled to one another directly in an arrangement wherein one can pass optical signals to the other or receive optical signals passed by the other with no intervening optical elements (other than free space or a passive waveguide or the like). Optical elements are optically coupled to one another indirectly in an arrangement wherein one can pass optical signals to the other or receive optical signals passed by the other with one or more other optical elements in the series intervening between them, e.g., an isolator, active waveguide (e.g., a coil of erbium doped fiber), a fused fiber mux or other multiplexer, etc. Thus, a component is in optical series with another component when it is arranged or operative to pass optical signals being processed by the amplifier to the other component, either directly or indirectly (or to receive optical signals from the other component, again, either directly or indirectly). Further, it should be understood that in at least certain exemplary embodiments of the optical amplifiers disclosed here, the GFF component is in series with the first optical gain stage or first amplifier stage notwithstanding that pump laser wavelengths are demultiplexed from the primary light path by the demux filter reflecting such pump laser wavelengths to the pump power optical waveguide. Thus, two or more components are said to be in series along the primary optical path, as the term is used here, even if there are intervening multiplexers or demultiplexers and the like.

It will be understood by those skilled in the technology of optical signal amplification, given the benefit of this disclosure, that an upstream gain stage, e.g., a coil of erbium doped fiber or other operative component of the gain stage from which amplified optical signals are passed to the gain-flattening component, is "upstream" of the gain-flattening component in the sense that such operative component precedes the gain-flattening filter in the direction of travel of optical signals along the optical pathway through the amplifier. Likewise, the second or subsequent gain stage to which gain-corrected optical signals are passed by the gain-flattening component, either directly or indirectly is "downstream" of the gain-flattening component.

It will also be understood by those skilled in the art of optical amplifiers and the like, given the benefit of this disclosure, that a "980 nm pump laser" such as may be used in certain exemplary embodiments of the amplifiers disclosed here, is a laser device operative when energized or actuated to emit optical energy (in some cases referred to here and in the appended claims as amplification wavelengths) at a wavelength (or band of wavelengths) about 980 nm. Similarly, a 1480 nm pump laser is operative to emit one or more amplification wavelengths at about 1480 nm. The choice of 980 nm or 1480 nm may or may not be critical, depending, e.g., on the particular application (if known) to which the optical amplifier is to be put. Likewise, the precise wavelength(s) emitted by the pump laser (to be multiplexed in the coil or otherwise arranged length of erbium doped fiber with the optical signals to be amplified) may or may not be critical to the particular use intended for the optical amplifier. Both 980 nm pump lasers and 1480 nm pump lasers are in many cases suitable for use in erbium doped fiber amplifiers. The actual wavelength(s) emitted by a pump laser typically may be plus or minus 20 nm or more from its nominal 980 nm or 1480 nm. For optical amplifiers intended for use in telecommunication applications to amplify multiplexed optical signals in the C-band (typically about 1530 nm to 1565 nm) using multiple coils of erbium doped fiber, the pump lasers typically are within about 10 nm plus or minus the nominal 980 nm or 1480 nm Different amplification wavelengths will be used in alternative embodiments of optical amplifiers according to the principles of this disclosure, employing optical gain stages other than (e.g., in addition to) erbium doped fiber. Given the benefit of this disclosure, it will be within the ability of those skilled in the art to select alternative sources of amplification wavelengths suitable to the choice of optical gain stage and the intended use of the amplifier.

It will also be understood by those skilled in the technology of optical signal amplification, given the benefit of this disclosure, that the aforesaid gain-flattening filter of the GFF component is "transmissive" of the amplified, multiplexed optical signals passed to it along the optical pathway from the first gain stage in that such wavelengths pass through the gain-flattening filter with an insertion loss and desired attenuation profile acceptable to the intended purpose of the amplifier. Similarly, it will be understood by those skilled in the technology of optical signal amplification, given the benefit of this disclosure that the thin film demux is "reflective" of the optical pump power wavelengths passed to it from the first gain stage in that such wavelengths are isolated from the multiplexed signal wavelengths adequately for the intended purpose.

It will also be recognized by those skilled in the art, given the benefit of this disclosure, that alternative and/or additional sub-components may be employed in certain embodiments of the GFF components disclosed here, and that alternative and/or additional components may be employed in certain embodiments of the optical amplifiers disclosed here. Alternative and additional components and sub-components include those presently known and those developed over time in the future. Multiple ferrule designs are known, for example, and it will be within the ability of those skilled in the art, given the benefit of this disclosure, to select and employ. suitable ferrules, if any, in various different embodiments of the GFF components and amplifiers disclosed here. Likewise, multiple alternative designs are known for collimating lenses and other lenses which may be used, including ball lenses, GRIN lenses, barrel lenses, aspherical lenses, etc. The optical amplifier, including the gain stages, gain-flattening component and any other components, e.g., lenses, ferrules, etc., necessary or useful for the optical amplifier or for connection into an optical system or the like, may be housed in a single housing as a single device or in multiple housings. Alternatively, in accordance with certain exemplary embodiments some or all of the components may be unhoused. The first and second gain stages or amplifier stages and the gain-flattening component between them optionally are packaged in immediate optical combination, that term being used here to mean that such components are packaged into a common housing, typically a hermetically or environmentally sealed housing, and/or that the gain-flattening filter is used in optical proximity to the gain stages in the optical pathway carrying the passband signals being amplified and gain-flattened, i.e., without other optical components between them other than optionally components or sub-components of the optical amplifier assembly, such as isolators, lenses, ferrules, taps or other signal monitoring components, optical multiplexer or demultiplexer components and the like to add or remove optical output of a pump laser or the like, etc. Certain of the amplifier components optionally are packaged separately for convenience of manufacture or use, e.g., to facilitate access to the signals between the different stages of the amplifier or for other reasons. Within an amplifier housing, sub-assemblies of components may be packaged within sub-housings. In general, it will be understood by those skilled in the art, given the benefit of this disclosure, that packaging of various embodiments of the GFF components and optical amplifiers disclosed here can typically employ a housing similar, for example, to the housings currently used for other fiber optics devices, e.g., commercial Dense Wavelength Division Multiplexer (DWDM) filters, etc.

As used here and in the appended claims, unless made clear otherwise by context, reference to a sub-component or component or feature as "first" (e.g., the reference above to "a first optical gain stage") in describing GFF components or optical amplifiers in accordance with the present disclosure is for convenience and does not mean that the component is necessarily the first such component in all embodiments of the optical amplifiers disclosed here. Similarly, unless made clear otherwise by context, reference to first and second ones of a particular type of component (e.g., reference to "first and second optical gain stages," etc.) in describing optical amplifiers in accordance with the present disclosure is not intended to limit all or any particular embodiments of the disclosed optical amplifiers necessarily to just two such components.

Thin-film filters employed in GFF components disclosed here, e.g., the gain-flattening filter, the demux filter, anti-reflection (A/R) coatings, etc., can be designed and manufactured in accordance with any suitable technology, equipment and techniques now known or known in the future, that are suitable for producing filters having a transmission curve with a loss profile sufficiently accurately corresponding to the gain profile of the optical amplifier. Suitable filters can be designed in accordance with current techniques, e.g., using commercially available software, such as Essential Macleod software, a comprehensive software package for the design and analysis of optical thin films, TFCalc from Software Spectra Inc., etc. Suitable filters can be manufactured in accordance with various currently known techniques, such as sputtering evaporation, electron beam gun evaporation, ion-assisted evaporation coating techniques, etc. Numerous suitable materials are commercially available and will be readily apparent to those skilled in the art, given the benefit of this disclosure.

Optionally, the first and second amplification stages can be packaged separately, i.e., in separate housings. This may be advantageous, for example, in order to allow access between the two stages for auxiliary signal treatment. Such auxiliary signal treatment between stages of a multi-stage optical amplifier can include, for example, dispersion compensation which may be performed by passing the partially amplified signals through a suitable length of dispersion compensation fiber or other suitable device. Auxiliary signal treatment between stages of a multi-stage optical amplifier also can include, for example, mux/de-mux processing to add and/or drop signals, etc. For purposes of the present disclosure, the two amplification stages in this embodiment may be considered to be parts of the same optical amplifier comprising both the fiber coils and the GFF and auxiliary components and sub-components.

Optionally one or more diagnostic features may be incorporated into the optical amplifiers and GFF components disclosed here. For example, one or more optical taps may be incorporated for performance monitoring. Such optical tap may comprise, for example, a photo diode or merely an optical fiber to feed optical information to a remote location, i.e., to a location outside the housing (if any) of the optical amplifier or to a receptor removed from the amplifier. Given the benefit of this disclosure, those skilled in the art will readily understand the use of signal strength and/or other optical tap information for performance monitoring or other diagnostic or control purposes. Such signal strength and/or other information can be obtained, for example, by an optical tap on the optical pathway through the amplifier, or an optical tap on the optical fiber or other waveguide carrying pump energy from a pump laser, or on the optical fiber or other waveguide carrying amplification wavelength(s) reflected by the demux filter to a mux with the optical pathway on the opposite side of the gain-flattening filter.

Certain exemplary embodiments of the optical components disclosed here for gain-flattening multiplexed passband signals amplified with optical pump power, comprise a housing in which both the thin film demux filter and the gain-flattening filter are mounted. A first lens is positioned between the launch port optical waveguide and the thin film demux filter, operative (i) to project combined multiplexed passband signals and optical pump power launched from the launch port optical waveguide to the thin film demux filter and (ii) to focus optical pump power reflected by the thin film demux filter to the output port optical waveguide. A second lens is positioned between the gain-flattening filter and the output port optical waveguide and is operative to focus multiplexed passband signals passed by the gain-flattening filter to the output port optical waveguide. In certain such embodiments the first lens and second lens each is selected from a ball lens, GRIN lens, barrel lens and aspheric lenses. In certain such embodiments the launch port optical waveguide, and the bypass port optical waveguide each is an optical fiber held together in a dual fiber ferrule fitted to the housing. In certain such embodiments the thin film demux filter (i.e., the surface of the optical substrate carrying the filter) is non-orthogonal to the direction of the light beam passing to or through the filter. Similarly, the surface is non-parallel to the end surface (e.g., an optical fiber end surface) of the launch port optical waveguide and the end surface (again, e.g., an optical fiber end surface) of the bypass port optical waveguide. In certain such embodiments the output port optical waveguide is an optical fiber held in a ferrule fitted to the housing. In certain such embodiment the gain-flattening filter is non-parallel to the optical fiber end-surface of the output port optical waveguide. In certain such embodiments the optical fiber end surfaces and lenses have anti-reflective coatings.

In certain exemplary 3-port embodiments of the GFF component, the thin film demux filter is on a first surface of a first optical substrate, and the gain-flattening filter is on a second surface of a second optical substrate. In certain other 3-port embodiments of the GFF component, the demux filter and the gain-flattening filter of the GFF component each can be provided on the surface of a suitable substrate, optionally, in accordance with certain embodiments discussed further below, on the same optical chip, i.e., on opposite sides of the same optical substrate. Thus, in such embodiments the thin film demux filter is on a first surface of an optical substrate, and the gain-flattening filter is on a second surface of the optical substrate. Optionally, the optical substrate is wedged, that is, the first surface and second surface are at an angle to each other greater than 0°, e.g., an angle of up to 1° off parallel or greater, such as an angle of about 0.25°. Certain 3-port embodiments of the GFF component further comprise a multiplexer optically coupling the bypass port optical waveguide and the output port optical waveguide to re-combine optical pump power reflected by the demux filter with multiplexed passband signals passed by the gain-flattening filter.

In certain exemplary 3-port embodiments of the GFF component, comprising a thin film demux filter on a first surface of an optical substrate facing the launch port optical waveguide and a gain-flattening filter on a second surface of the optical substrate facing the output port optical waveguide, the first surface and second surface being non-parallel to each other at an angle of up to 1° or more. Certain such embodiments further comprise:

a housing in which the optical substrate carrying both the thin film demux filter and the gain-flattening filter is mounted;

a first lens positioned between the launch port optical waveguide and the thin film demux filter, operative (i) to project combined multiplexed passband signals and optical pump power launched from the launch port optical waveguide to the thin film demux filter and (ii) to focus optical pump power reflected by the thin film demux filter to the output port optical waveguide; and a second lens positioned between the gain-flattening filter and the output port optical waveguide, operative to focus multiplexed passband signals passed by the gain-flattening filter to the output port optical waveguide.

In certain such embodiments of the GFF component:

the first lens and second lens each is selected from a ball lens, GRIN lens, barrel lens and aspheric lens, the launch port optical waveguide and the bypass port optical waveguide each is an optical fiber held together in a dual fiber ferrule fitted to the housing, the surface of the optical substrate carrying the thin film demux filter, the optical fiber end-surface of the launch port optical waveguide, and the optical fiber end surface of the bypass port optical waveguide each is non-orthogonal to the light beam i.e., the optical path, the output port optical waveguide is an optical fiber held in a ferrule fitted to the housing, the gain-flattening filter is non-parallel to the optical fiber end-surface of the output port optical waveguide, and the optical fiber end surfaces and lenses have anti-reflective coatings.

In certain exemplary 3-port embodiments of the GFF component the thin film demux filter is on a reflector surface of a first optical substrate, and the gain-flattening filter is on a second optical substrate. The second optical substrate has an output surface which faces the output port optical waveguide and is operative to reflect optical pump power. Certain such embodiments further comprise:

an isolator, positioned in an optical path between the first optical substrate and the second optical substrate, the isolator being operative to provide high return loss for pump power wherein a second surface of the second optical substrate faces the isolator; and a pump power optical waveguide operative to carry optical pump power and oriented to launch optical pump power toward the output surface of the second optical substrate, wherein the output port optical waveguide, the pump power optical waveguide and the output surface of the second optical substrate are oriented to reflect pump power from the pump power optical waveguide to the output port optical waveguide. In certain such embodiments the reflector surface of the first optical substrate faces the launch port optical waveguide, and an oppositely facing second surface of the first optical substrate faces the isolator. Optionally, the first optical substrate can be wedged, such that the reflector surface and the oppositely facing second surface are non-parallel to each other at an angle of up to 1° off parallel. It will be understood from this disclosure by those skilled in the art, that the isolator in the above described embodiments and the other embodiments of GFF components and optical amplifiers disclosed here, that the one or more isolators employed therein pass the passband in the forward direction only and pass the optical pump power little or not at all in either direction.

In certain exemplary 3-port embodiments of the GFF component:

the gain-flattening filter is at the output surface of the second optical substrate, whereby the output surface of the second optical substrate is both reflective of the optical pump power and operative to provide a desired attenuation profile to multiplexed passband signals in the passband wavelength range; and an oppositely facing second surface of the second optical substrate faces the isolator Here, again, as in other embodiments of the GFF components disclosed here, the second optical substrate optionally is wedged, such that the output surface and the oppositely facing second surface of the second optical substrate are non-parallel to each other at an angle of up to 1° or more off parallel.

In certain exemplary 3-port embodiments of the GFF component, the gain-flattening filter is carried on an oppositely facing second surface of the second optical substrate, which faces the isolator. Here, again, the second optical substrate optionally is wedged, such that the output surface and the oppositely facing second surface of the second optical substrate are non-parallel to each other at an angle of up to 1° or more off parallel. Certain such embodiments further comprise:

a housing in which the first and second optical substrates and the isolator are mounted;

a first lens positioned between (i) the launch port optical waveguide and bypass port optical waveguide and (ii) the reflector surface of the first optical substrate, the first lens being operative to focus:

combined multiplexed passband signals and optical pump power from the launch port optical waveguide to the demux filter, and optical pump power reflected by the demux filter to the bypass port optical waveguide; and a second lens positioned between (i) the second optical substrate and (ii) the output port optical waveguide and pump power optical waveguide, the second lens being operative:

to focus multiplexed passband signals passed by the gain-flattening filter to the output port optical waveguide, to project optical pump power from the pump power optical waveguide to the output surface of the second optical substrate, and to focus optical pump power reflected by the output surface of the second optical substrate to the output port optical waveguide.

In certain such embodiments:
the first lens and second lens each is selected from a ball lens, GRIN lens, barrel lens and aspheric lens,
the launch port optical waveguide and the bypass port optical waveguide each is an optical fiber held together in a dual fiber ferrule fitted to the housing,
the thin film demux filter is non-parallel to the optical fiber end-surface of the launch port optical waveguide and the optical fiber end surface of the bypass port optical waveguide,
the output port optical waveguide and pump power optical waveguide each is an optical fiber held together in a dual fiber ferrule fitted to the housing, and
the output surface of the second optical substrate, the optical fiber end-surface of the output port optical waveguide and the optical fiber end-surface of the pump power optical waveguide each is non-orthogonal to the light path of the passband signals.

In such embodiments and the other embodiments of GFF components and optical amplifiers disclosed here, optical fiber end surfaces, lenses, otherwise uncoated optical chip surfaces, etc. may have AR coatings in accordance with known design techniques, whose applicability here will be apparent to those skilled in the art, given the benefit of this disclosure.

Optionally in such embodiments the bypass port optical waveguide and the pump power optical waveguide are portions of the same optical fiber pathway, optical pump power reflected by the thin film demux filter to the bypass port optical waveguide being communicated to the pump power optical waveguide to be reflected by the output surface of the second optical substrate to the output port optical waveguide. The optical fiber pathway may be an uninterrupted length of optical fiber or other suitable waveguide. In some embodiments the optical fiber pathway comprises a splice multiplexer/demultiplexer operative to provide further isolation of multiplexed passband signals from the optical pump power carried by the optical fiber pathway.

Figure 2:
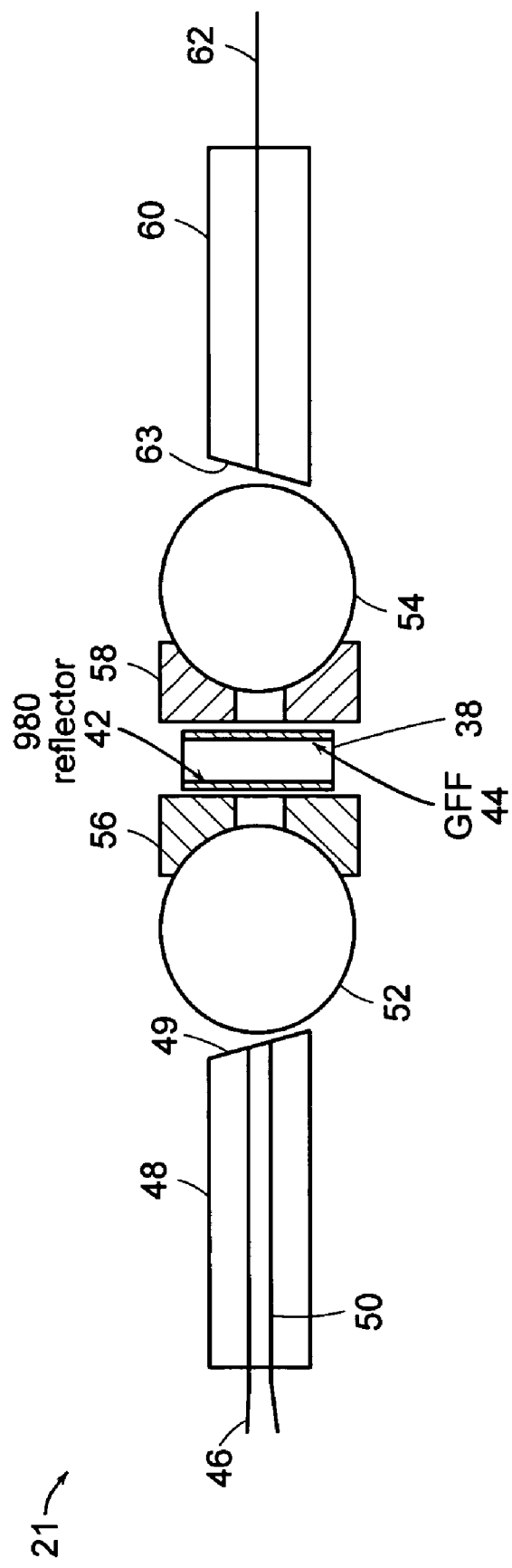
FIG. 2 is a schematic view of a component layout for the GFF component of the optical amplifier of FIG. 1.
Figure 3:
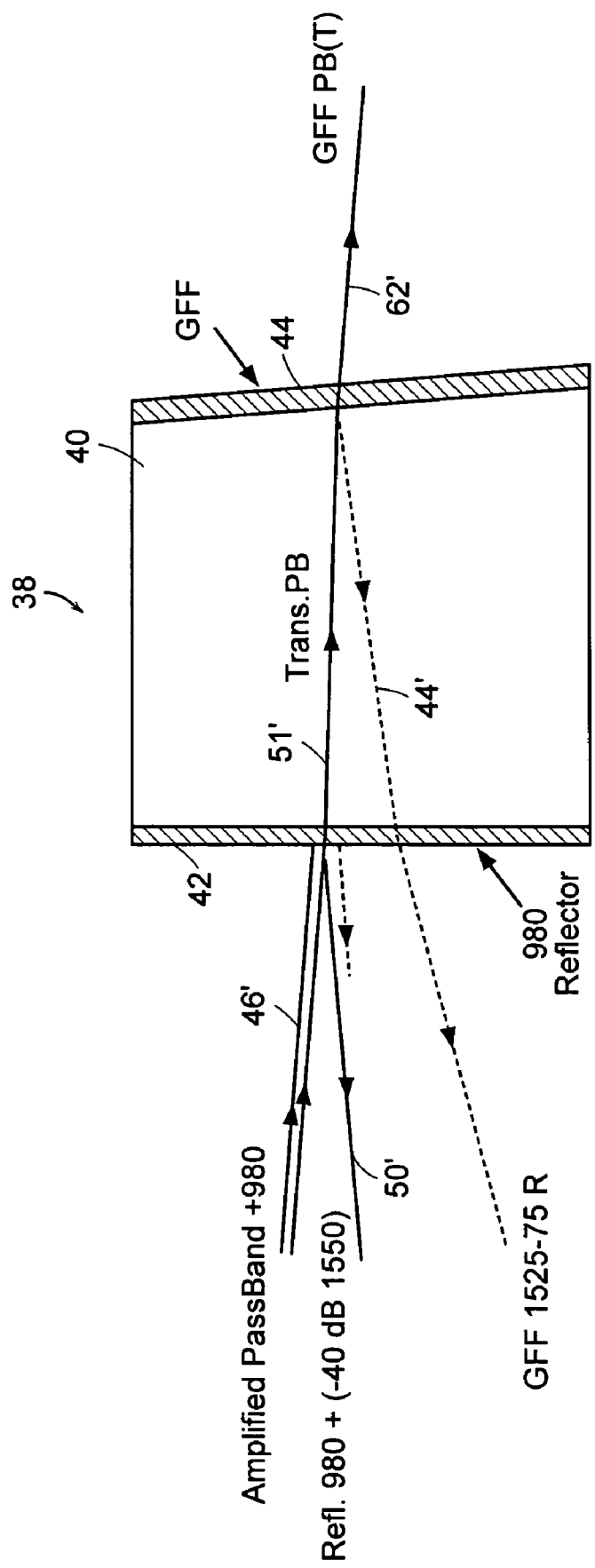
FIG. 3 is a schematic illustration of the optical chip layout for the GFF component of FIG. 2, showing the path of amplified passband signals and optical pumping power.

Referring now to FIGS. 1-3, FIG. 1 schematically illustrates one embodiment of an optical amplifier in accordance with the present disclosure. Specifically, optical amplifier 20 is seen to comprise two gain stages, EDFA 22 and EDFA 24, and a GFF component 26 positioned between the two gain stages. Those skilled in the art will recognize that additional components and subcomponents typically will be employed and, in this respect, isolators 27, 28 and 29 are shown. Multiplexed optical signals in a passband, such as the C-band, are carried by suitable optical fiber 30 which may be, for example, Smf28_(Corning). Suitable alternative waveguides, such as other suitable optical fibers, will be apparent to those skilled in the art given the benefit of this disclosure. Optical pump power is fed via optical fiber 32 from pump laser 34. In the illustrated embodiment, the pump laser can be, for example, a 980 nm pump laser. Suitable such pump lasers are commercially available and will be readily apparent to those skilled in the art in view of the present disclosure. Suitable optical fiber for carrying the pump power includes, for example, HI 1060 Flex (Corning) and OCS 980-20 (available from OFC, a Furakawa company). Here, again, suitable alternative optical fibers and other waveguides will be apparent to those skilled in the art given the benefit of this disclosure. Multiplexer 36 may be an s-mux or other suitable multiplexer for combining the passband signals from waveguide 30 with the pump power of waveguide 32. The combined signals are fed to EDFA 22 in which the passband signals are amplified and then fed to the 3-port GFF component 26 for gain-flattening. As best seen in FIGS. 2 and 3, the GFF component 26 combines a 980 nm reflector and a GFF filter on a single optical chip. More specifically, optical chip 38 comprises optical substrate 40 which may be, for example, any of numerous commercially available optical glasses or other such substrates which are transparent to the multiplexed passband signals. Substrate 40 has on its input or upstream surface a 980 nm reflector 42 and on its output or downstream surface a gain-flattening filter 44. As best seen in FIG. 3, optical chip 38 is wedged (i.e., wedge-shaped) to prevent or inhibit signals being captured by the reflection port. Launch port optical waveguide 46 communicates multiplexed passband signals combined with optical pump power from the first or upstream gain stage 22 to the GFF component. Waveguide 46 may be, for example, any of the 980 nm optical fibers mentioned above or other suitable waveguide. In the illustrated embodiment, optical fiber 46 is in a dual fiber ferrule 48 along with a pump power fiber, referred to in this embodiment as a bypass port optical waveguide 50, which also may be any suitable waveguide, including the 980 nm optical fibers mentioned above. It can be seen that the launch surface 49 of ferrule 48 is angled in accordance with known techniques, such that it is non-orthogonal to the direction of the light beam. The GFF component 26 further comprises input ball lens 52 and output ball lens 54 in suitable mountings 56, 58, respectively. The output end or portion of the GFF component 26 comprises output ferrule 60 holding optical fiber 62. The face 63 of ferrule 62 is angled, similar to surface 49 of ferrule 48. Since optical fiber 62 carries passband signals without optical pump power (the optical pump power having been reflected out of the optical path by 980 nm reflector 42), may be, for example, Smf 28 optical fiber or the like. Thus, GFF component 26 is seen to be a 3-port component. The optical pump power reflected by 980 nm reflector 42 is recombined with the passband signals at mux 64 which may be, for example, a splice multiplexer (s-mux) or other suitable multiplexer. The combined signals and optical pump power are fed to the second gain stage, EDFA 24, for further amplification of the passband signals, following which the signal output can be passed to further processing, including isolator 29, etc.

In accordance with an advantageous aspect of the embodiments of FIGS. 1-3, gain-flattening filter 44 provides an attenuation profile suitable to compensate for some or all of the uneven amplification by both first and second gain stages 22, 24. In addition, the gain-flattening filter can compensate for other gain influences in the optical amplifier 20, for other system components and sub-components.

As seen in FIG. 3, the combined passband signals and optical pump power carried by launch port optical waveguide 46 is communicated with 980 nm reflector 42 which passes the passband signals to the gain-flattening filter 44 and reflects the optical pump power to bypass port optical waveguide 50. The optical path 46' shown in FIG. 3 includes, therefore, combined passband signals and optical pump power (carried by launch port optical waveguide 46 from first EDFA 22). The optical pump power 50' is reflected by 980 nm reflector 42 into bypass port optical waveguide 50. The 980 nm reflector is a thin-film demux filter which can in certain embodiments provide excellent demultiplexing of the passband signals from the optical pump power. Passband signals 51' are passed by the 980 nm reflector 42 to GFF filter 44 on the opposite surface of optical chip 38. The passband signals there are provided the aforesaid attenuation profile and are passed along optical path segment 62' to output port optical waveguide 62. Minor reflection of passband signals 44' by gain-flattening filter 44 are not properly aligned for insertion into bypass port optical waveguide 50 and, therefore, do not negatively impact performance quality. It will be appreciated by those skilled in the art, given the benefit of this disclosure, that the embodiments of FIGS. 1-3 advantageously facilitate alignment of the 980 nm optical pump power without a significant reflected portion of the passband signals, resulting in less or no multi-path interference.

Figure 4:
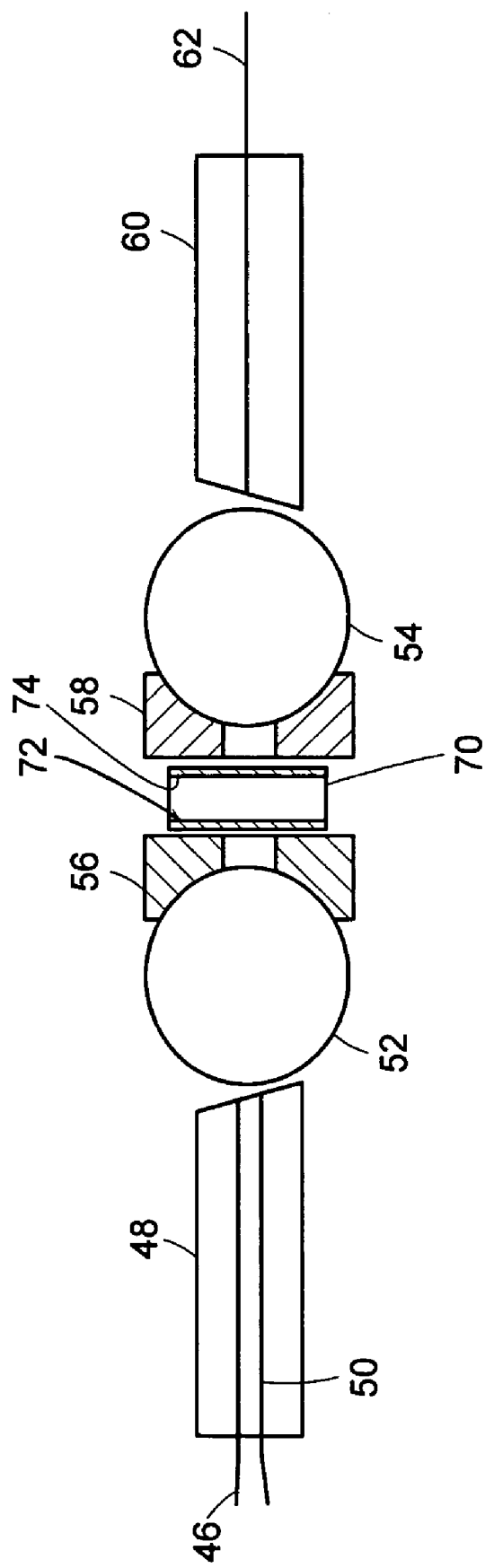
FIG. 4 is a schematic illustration of a component layout for a GFF component in accordance with an alternative embodiment.

Referring now to FIG. 4, an alternative component layout is shown for a single chip, 3-port GFF component. Components common to the embodiments of FIGS. 1-3 are labeled with the same reference numerals. In the embodiment of FIG. 4, optical chip 70 has on its upstream or input surface a combined coating 72. Coating 72 is operative both as a 980 nm reflector and as a gain-flattening filter. Opposite surface 74 is provided with an anti-reflecting coating.

Figure 5:
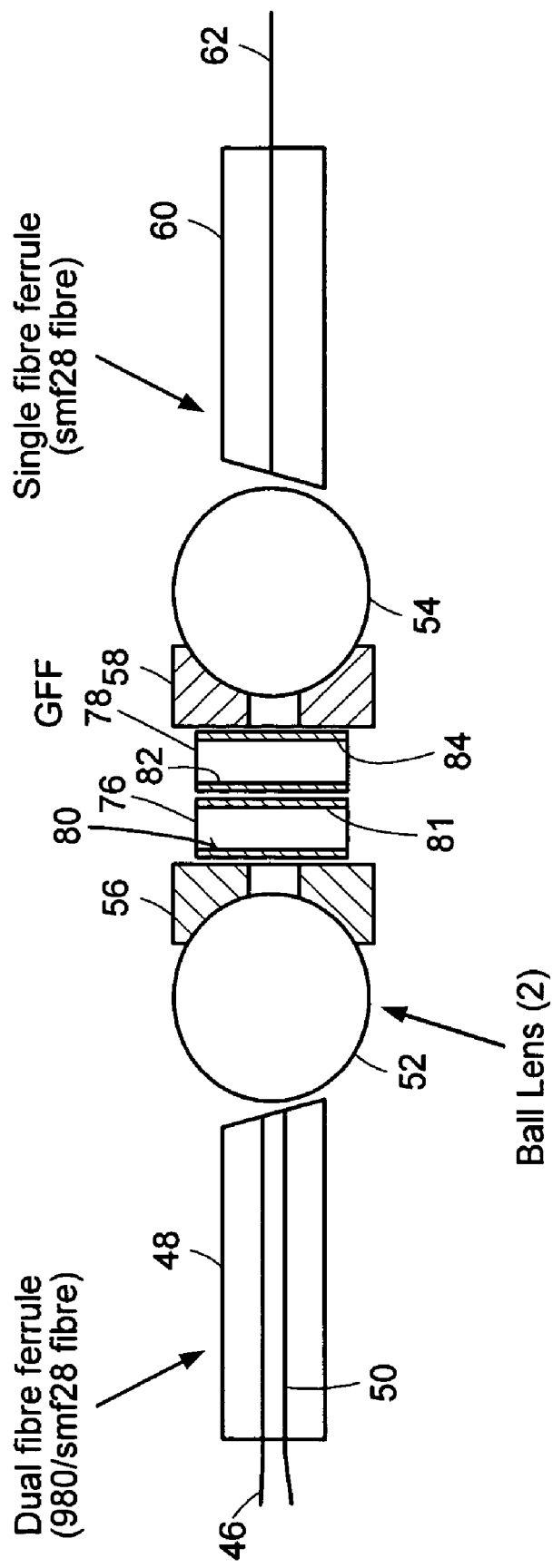
FIG. 5 is a schematic illustration of a component layout for another 3-port GFF component in accordance with the present invention.

Referring now to FIG. 5, the component layout is illustrated for an alternative embodiment of a 3-port GFF component suitable for use in optical amplifiers disclosed here. The embodiment of FIG. 5 is a dual chip GFF component comprising an input or upstream chip 76 and a downstream or output chip 78. The input or upstream face of optical chip 76 carries 980 nm reflector 80. The opposite surface of the chip has an anti-reflection coating 81. The upstream or input face of second optical chip 78 carries gain-flattening filter 82 and the opposite surface carries anti-reflection coating 84. The GFF component of FIG. 5 operates substantially in accordance with the principles disclosed above to provide an attenuation profile to compensate for uneven amplification of multiplexed passband signals while bypassing optical pump power to a subsequent gain stage.

Figure 6:
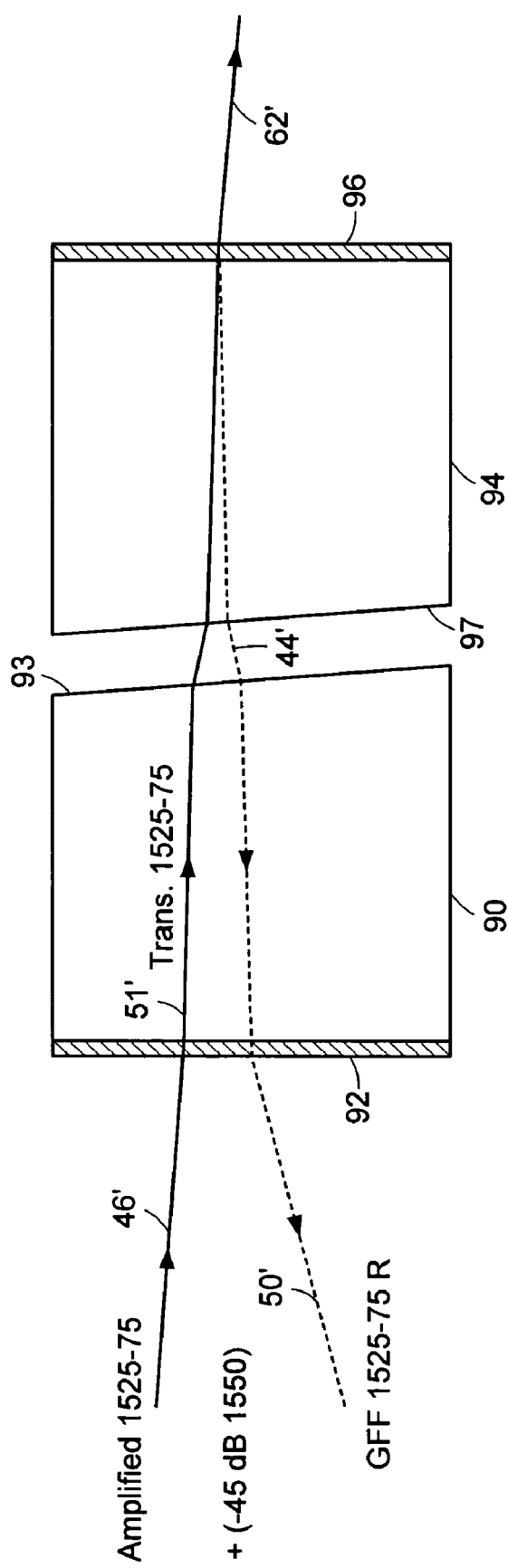
FIG. 6 is a schematic illustration of the chip layout of the GFF component of FIG. 5, showing the path of amplified passband signals and optical pump power.

FIG. 6 schematically illustrates a chip layout for a dual chip 3-port GFF component in accordance with an alternative embodiment. Input chip 90 has 980 nm reflector 92 on its input surface and an AR coating (not shown) on its output surface 93. Second chip 94 carries gain-flattening filter 96 on its output surface (as opposed to the embodiment of FIG. 5 wherein the gain-flattening filter is carried on the input surface 97 of the second optical chip). The opposite surface 97, that is, the input surface of second chip 94 has an AR coating (not shown). It can be seen that both optical chips 90, 94 are wedged. For each, the input surface and output surface are non-orthogonal to the direction of the light beam to reduce etaloning effect. Combined passband signals and optical pump power 46' (using here the same reference numerals used in FIG. 3) are communicated to 980 nm reflector 92. Optical pump power 50' is reflected by the 980 nm reflector 92 to an optical power wave guide, such as a bypass port optical waveguide, while passband signals 51' passed by a 980 nm reflector 92 travel to gain-flattening filter 96. Passband signals 62' passed by the gain-flattening filter with a desired attenuation profile are passed to an output port optical waveguide while any reflection 44' of passband signals is simply lost or dumped.

Figure 7:
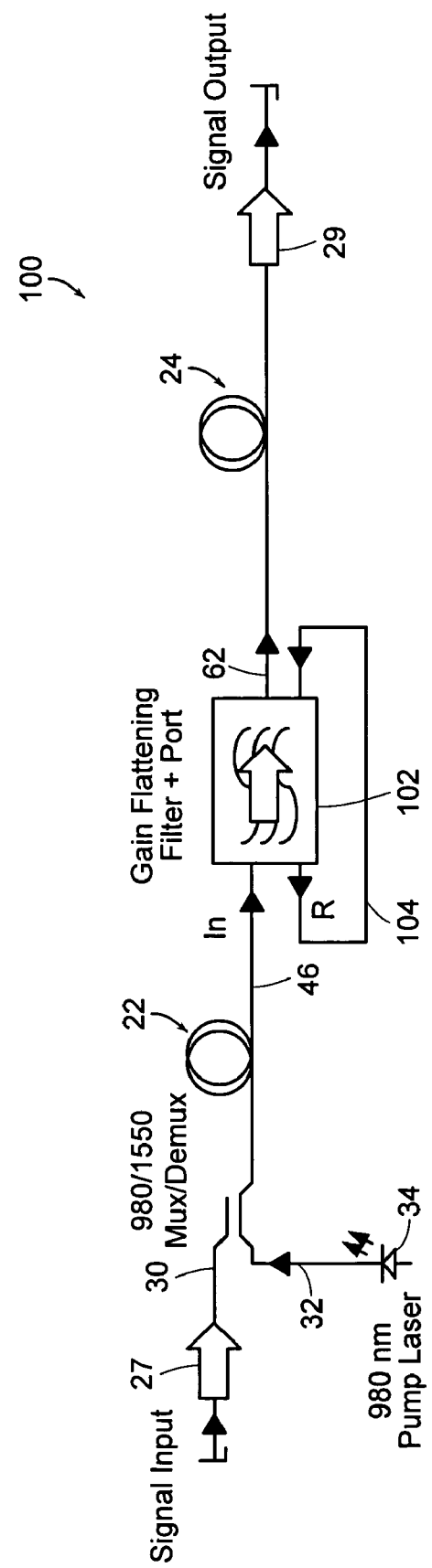
FIG. 7 is a schematic illustration of an optical amplifier in accordance with another embodiment of the invention, comprising a 4-port GFF component in accordance with one embodiment of that aspect of the invention.
Figure 8:
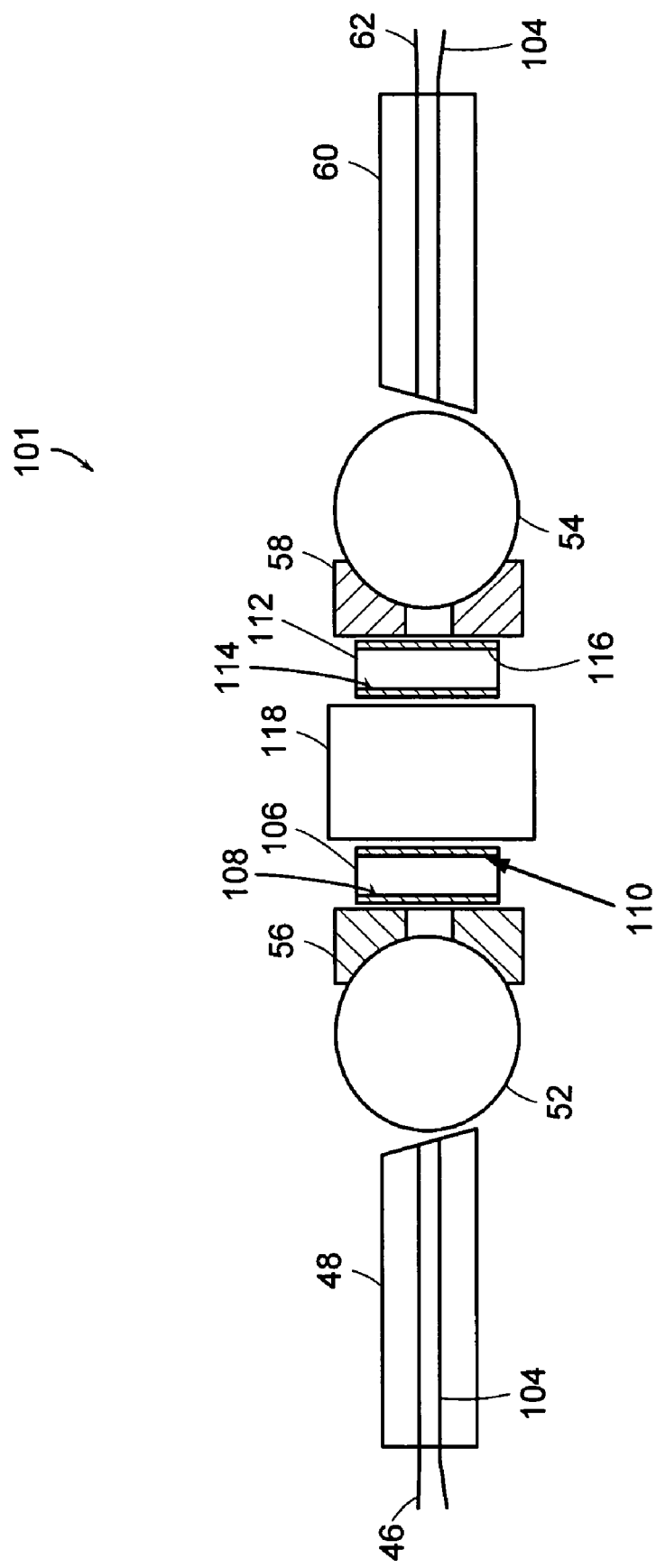
FIG. 8 is a schematic illustration of the component layout of the GFF component of FIG. 7.

Referring now to FIGS. 7 and 8, FIG. 7 illustrates an alternative embodiment of an optical amplifier in accordance with the present disclosure. Specifically, FIG. 7 illustrates a 4-port multiple gain stage optical amplifier in accordance with the present disclosure. FIG. 7 illustrates a component layout suitable for the GFF component of the optical amplifier of FIG. 7. For ease of reference, the same reference numerals are used for features and components in common with the embodiment of FIGS. 1-3. The optical amplifier 100 of FIG. 7 comprises 4-port GFF component 102 between first and second gain stages 22, 24. As seen in FIG. 8, GFF component 102 is a dual chip design incorporating an isolator. The isolator can be packaged together with the optical chips of the GFF component in a housing (not shown). As noted above, because 980 nm pump power and other amplification wavelengths would not suitably pass through a typical GFF component positioned between gain stages, it has been known to employ a fused fiber demux to remove the amplification wavelengths from the signal wavelengths after the first gain stage. A co-located isolator does not pass 980 nm signals well or at all (e.g., ~70 dB attenuation). Positioning the isolator between gain stages in the embodiment of FIGS. 7 and 8 provides excellent noise performance. It suppresses backward amplified stimulated emissions (ASE, from subsequent booster stages to maintain high front end first stage inversion and a low noise figure (NF). The GFF component is conveniently co-located and the optimum position for the combination can be found by careful Noise vs. Pump Power Consumption vs. Multi-Path Interference (MPI) trade-offs in accordance with techniques whose applicability to the implementation of the optical amplifiers disclosed here will be apparent to those skilled in the art in view of this disclosure. Such implementation can be done with recognition that too short a first stage can impair the first gain stage and, therefore, overall noise performance, while too long a first stage length can result in excessive backward ASE etc. A pump bypass makes for an efficient amplifier in accordance with this disclosure, where remnant first gain stage pump power can be routed to the second stage.

The optical amplifier of FIG. 7 and the GFF component of FIG. 8, as well as the other embodiments illustrated in the drawings can be assembled and packaged in accordance with optical component and subcomponent techniques which will be apparent to those skilled in the art given the benefit of this disclosure. Referring again to FIG. 7, it can be seen that bypass port optical waveguide 104 communicates from the input of the GFF component to the output GFF component in accordance with the principles disclosed above, optical pump power carried to the GFF component from the first gain stage 22 is reflected into bypass port optical waveguide 104 at the input end of GFF component 102 and carried by waveguide 104 to the output end of the GFF component. At the output end, the optical pump power is reflected by a second 980 nm reflector into an output optical waveguide 62. Thus, the optical pump power is recombined with the passband signals by such second 980 nm reflector acting as a multiplexer. It will be appreciated that in this embodiment, as in other embodiments disclosed and discussed here, a single pump laser or other suitable source provides optical pump power for both first and second gain stages of a two-gain stage optical amplifier. In that regard, it can be seen with reference to FIG. 8, that good design efficiency is achieved by the GFF component in this respect. Input optical chip 106 has a first 980 nm reflector 108 at its input face surface and an AR coating 110 on its output or downstream surface. Second optical chip 112 has a gain-flattening filter on its input surface and a second 980 nm reflector 116 on its output surface. An isolator 118 is positioned between the two optical chips of the GFF component. The GFF component 102 of FIG. 7 operates generally in accordance with the principals discussed above.

Figure 9:
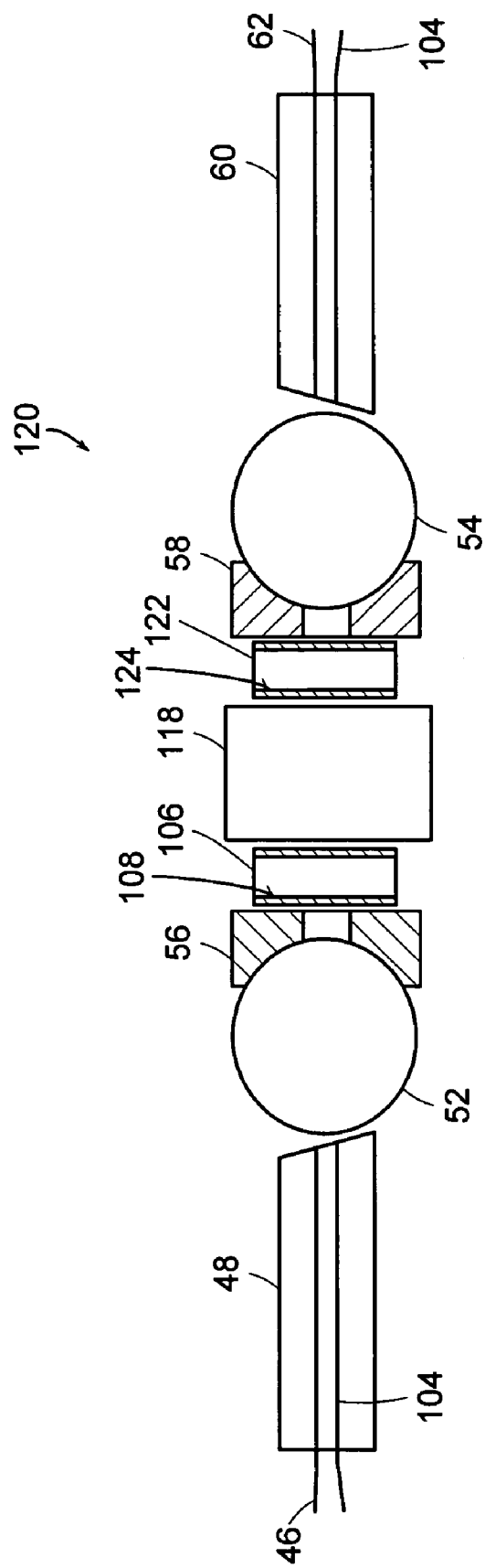
FIG. 9 is a schematic illustration of the component layout of an alternative embodiment of a 4-port GFF component, suitable for use in optical amplifiers such as the optical amplifier of FIG. 7.
Figure 10:
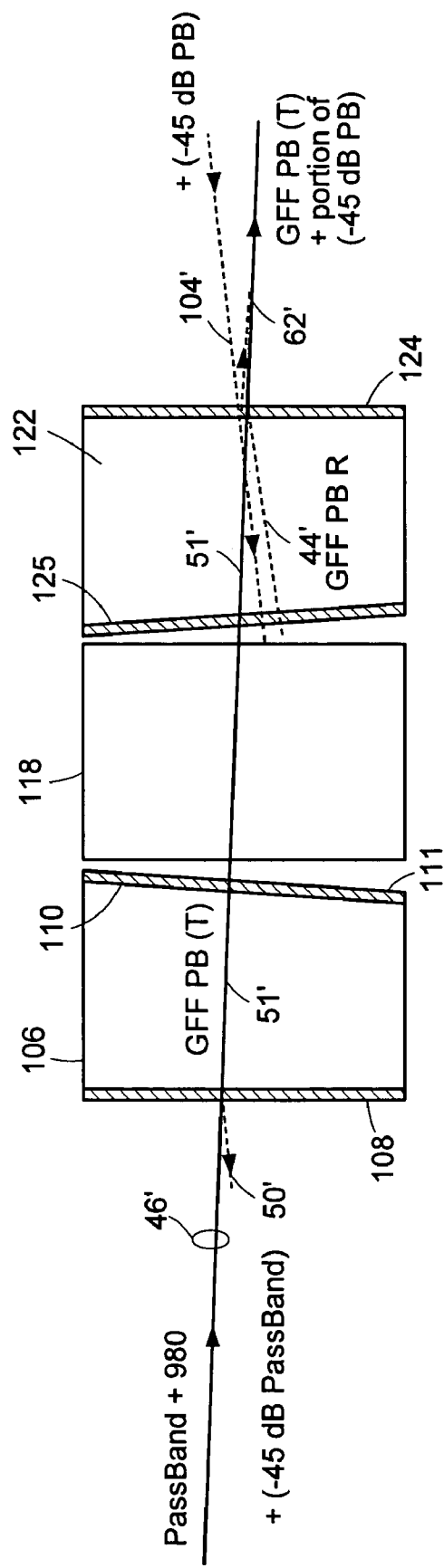
FIG. 10 is a schematic illustration of an optical chip layout of the 4-port GFF component of FIG. 9, showing the path of amplified passband signals and optical pumping power.

FIGS. 9 and 10 illustrate the component layout and chip layout, respectively, for an alternative embodiment of a 4-port GFF component in accordance with the present disclosure. The reference numerals used in FIGS. 9 and 10 are the same as those in FIGS. 7 and 8 for components in common therewith. The GFF component 120 is seen in FIG. 9 to comprise dual fiber ferrule 48 having launch port optical waveguide 46 suitable to carry multiplexed passband signals combined with optical pump power from an EDFA or other gain stage of an optical amplifier. Ferrule 48 also has the upstream or input end of optical pumping power waveguide 104. Lens 52 is operative to pass the combined passband signals and pump power from waveguide 46 to the input surface of the first optical chip 106 which carries 980 nm reflector 108. Pump power reflected by reflector 108 is focused by lens 52 into waveguide 104. Passband signals are passed by the 980 reflector 108 through isolator to second optical chip 122. The output or downstream surface of chip 122 has a combined 980 nm reflector and gain-flattening filter 124. Optical chip 106 has an anti-reflection coating 110 on its output surface facing isolator 118. Similarly, the input surface of optical chip 122 has anti-reflection coating 125 facing isolator 118. Dual fiber ferrule 60 has the output end of pump power waveguide 104 and the input end of waveguide 62. Pump power passes from waveguide 104 through lens 54 to the combined 980 nm reflector/GFF 124 to be reflected and then focused by lens 54 into waveguide 62 along with passband signals processed by the GFF component to provide a desired attenuation profile. The combined passband signals and pump power can be passed by waveguide 62 to a subsequent gain stage in accordance with the principles discussed above. The optical paths shown in FIG. 10 include, in addition to those discussed above in connection with other embodiments, optical path 104' for the pump power (and residual passband signal) launched from the output end of waveguide 104.

Figure 11:
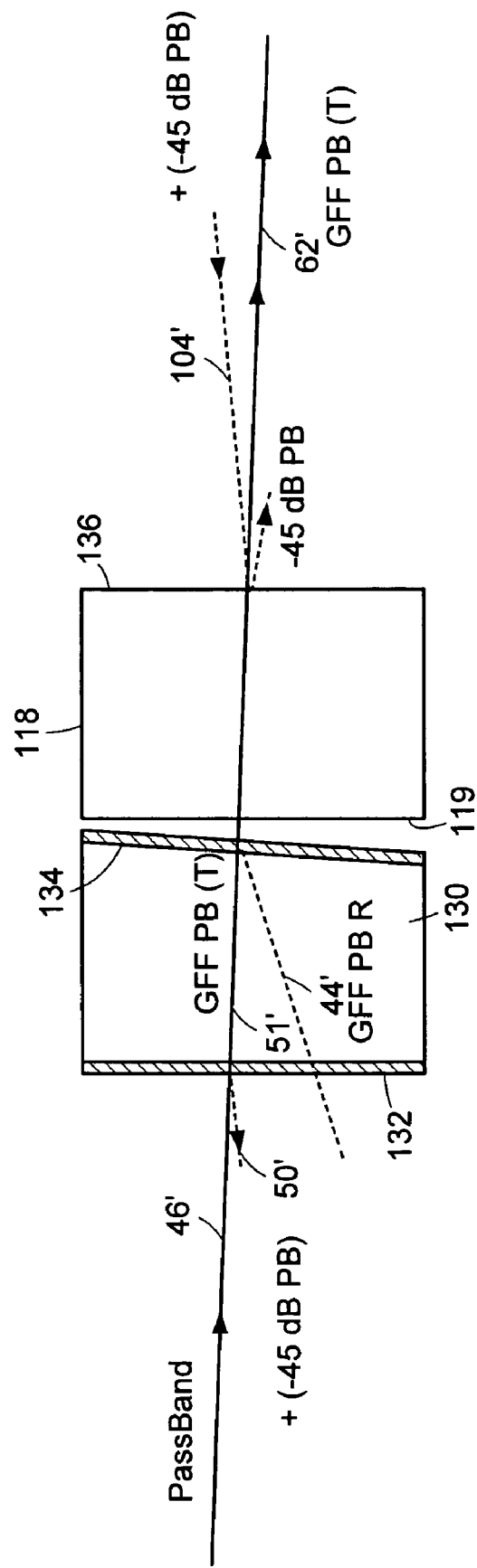
FIG. 11 is a schematic illustration of a chip layout for a GFF component in accordance with an alternative embodiment, showing the path of amplified passband signals and optical pump power.

FIG. 11 schematically illustrates the chip layout of an alternative 4-port embodiment of a GFF component in accordance with the present disclosure. The 4-port GFF component of FIG. 11 employs an isolator along with a single optical chip carrying both a 980 nm reflector and a gain-flattening filter. More specifically, in the chip layout of the embodiment of FIG. 11, optical chip 130 has a 980 nm reflector 132 on its input face and a gain-flattening filter 134 on its output face facing isolator 118. The 4-port chip layout of FIG. 11 provides good cost and packaging efficiency and is suitable for use in GFF component embodiments, such as that of FIG. 7, wherein optical pump power is fed to the output end of the GFF component to be reflected into an output port optical waveguide to be carried (along with the multiplexed passband signals passed by the GFF) to a subsequent amplification stage. In that respect, in the embodiment of FIG. 11 the 980 nm reflector 136 is provided on the output surface of isolator 118. The optical pathways are shown in FIG. 11 for a GFF component comprising such chip layout.

Figure 12:
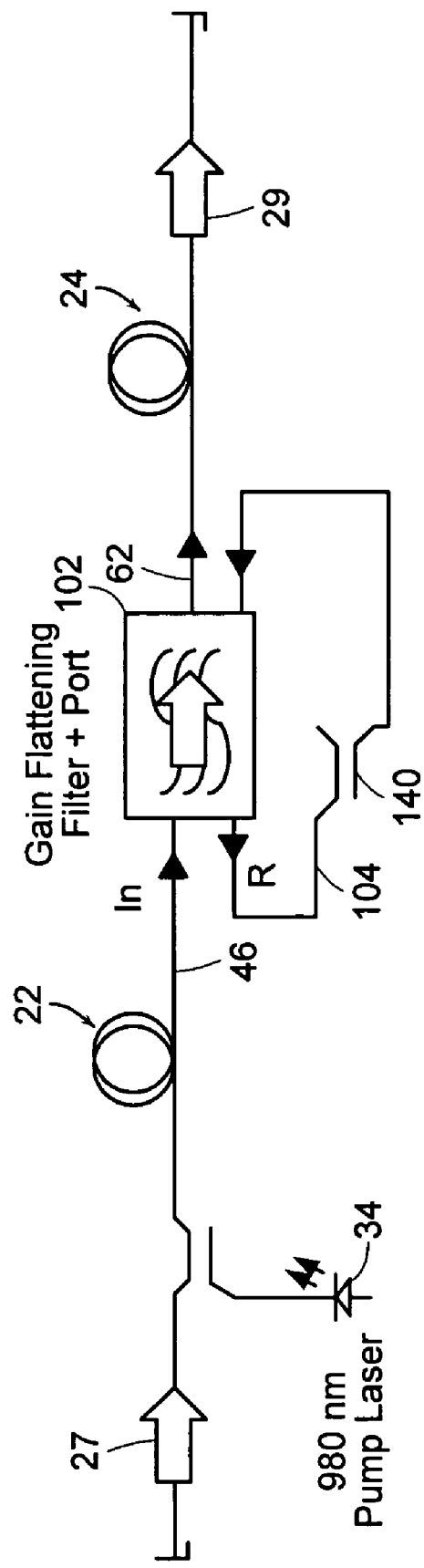
FIG. 12 is a schematic illustration of an optical amplifier in accordance with another embodiment of the invention, comprising a 4-port GFF component in accordance with an embodiment of that aspect of the invention.

FIG. 12 is a somewhat simplified schematic illustration of an optical amplifier in accordance with an alternative embodiment. The optical amplifier of FIG. 12 is similar to the embodiment illustrated in FIG. 7. In the embodiment of FIG. 12 a mux/demux 140 is provided in optical power waveguide 104, for example, an s-mux/demux or the like, to provide enhanced isolation of passband signals from the optical pump power carried by waveguide 104 to the output end of the GFF component.

Figure 13:
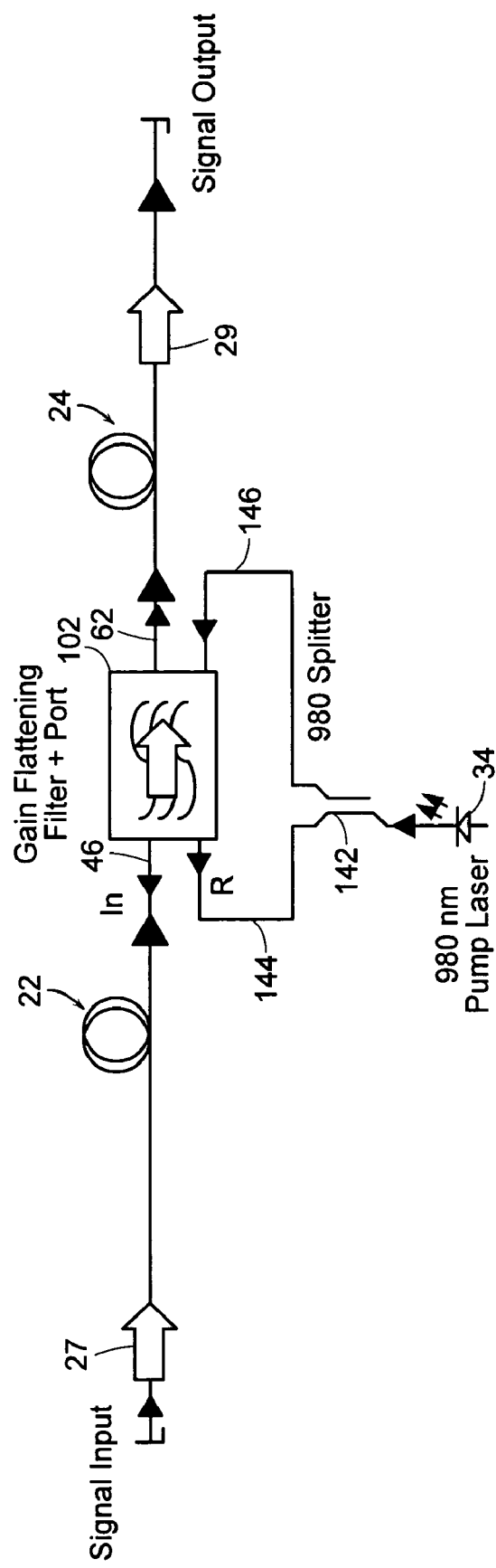
FIG. 13 is a schematic illustration of an optical amplifier in accordance with another embodiment of the invention, comprising a 4-port GFF component in accordance with an embodiment of that aspect of the invention.

An alternative embodiment of an optical amplifier in accordance with the present disclosure is schematically illustrated in FIG. 13. The embodiment of FIG. 13 may be referred to as a center-pumped optical amplifier and employs a 4-port GFF component in accordance with the present disclosure, for example, the 4-port GFF component of FIG. 8 or FIG. 9 or other suitable embodiments of the GFF components disclosed here. In the center-pumped embodiment of FIG. 13, pump laser 34, for example, a 980 nm pump laser, provides optical pump power to both the input and output ends of GFF component 102. A 980 nm splitter 142 is used to pass optical pump power to the input end of GFF component 102 via 980 nm optical fiber 144 and to the output end of GFF component 102 via optical fiber 146. The optical fibers 144 and 146 may be any of the 980 nm fibers referred to above or other suitable waveguides. A 980 nm reflector at the input end of GFF component 102 reflects the optical power into launch port optical waveguide 46 to be passed to first gain stage 22. Similarly, waveguide 146 feeds optical pump power to a 980 nm reflector at the output end of GFF component 102 to be reflected into output port optical waveguide 62 to be passed to second gain stage 24. Thus, optical pump power is up-communicated to the first gain stage and down-communicated to the second gain stage. The chip layout embodiment of FIG. 10 and the alternative chip layout embodiment of FIG. 11 each provides a 980 nm reflector at its input and output surfaces and is suitable for use in the GFF component of the optical amplifier embodiment of FIG. 13. Stated otherwise, the first gain stage 22 can be said to be counter-pumped with 980 nm optical pump power and the second gain stage 24 can be said to be co-pumped with optical pump power.

Given the benefit of this disclosure, it will be within the ability of those skilled in the art to design and assemble GFF components in accordance with the present disclosure and optical amplifiers employing such GFF components in accordance with the present disclosure. With respect to the chip layout of FIG. 10, for example, a first collimator can be aligned using the 980 nm reflector chip in reflection, using 980 nm pigtails suited to this purpose. The isolator can be added with static alignment, followed by aligning the second collimator using the GFF optical chip in reflection and 980 nm pigtails suited to this purpose. Finally, collimators are aligned in transmission while angle tuning the GFF center wavelength for minimum peak-to-peak error function (PPEF). The subcomponents of the GFF component, including the optical chips, isolator (if any) collimators, etc., can be packaged in any suitable housing, again in accordance with available designs and techniques whose applicability to the present invention will be apparent in view of the present disclosure.

It should be understood that the use of a singular indefinite or definite article (e.g., "a," "an," "the," etc.) in this disclosure and in the following claims follows the traditional approach in patents of meaning "at least one" unless in a particular instance it is clear from context that the term is intended in that particular instance to mean specifically one and only one.

Although the present invention has been described in terms of specific exemplary embodiments, it will be appreciated that various modifications and alterations will be apparent from this disclosure to those skilled in the art, without departing from the spirit and scope of the invention as set forth in the following claims.

We claim:

1. An optical component for gain-flattening multiplexed passband signals amplified with optical pump power, comprising:
    a launch port optical waveguide operative to communicate multiplexed passband signals in a passband wavelength range and optical pump power in a different wavelength range;
    a thin film demux filter oriented to receive combined multiplexed passband signals and optical pump power from the launch port optical waveguide, and operative to pass the multiplexed passband signals and to reflect the optical pump power;
    a bypass port optical waveguide operative and oriented to receive and carry optical pump power reflected by the demux filter;
    a gain-flattening filter positioned to receive from the thin film demux filter and operative to pass the multiplexed passband signals with a desired attenuation profile for gain-flattening; and
    an output port optical waveguide oriented to receive and operative to carry at least multiplexed passband signals passed by the gain-flattening filter.

2. The optical component of claim 1 for gain-flattening multiplexed passband signals amplified with optical pump power, further comprising:
    a first lens operative to focus combined multiplexed passband signals and optical pump power from the launch port optical waveguide to the demux filter and to focus optical pump power reflected by the thin film demux filter to the bypass port optical waveguide; and
    a second lens operative to focus multiplexed passband signals passed by the gain-flattening filter to the output port optical waveguide.

3. The optical component of claim 2 for gain-flattening multiplexed passband signals amplified with optical pump power, wherein:
    the first lens is positioned between the launch port optical waveguide and the thin film demux filter,
    the second lens is positioned between the gain-flattening filter and the output port optical waveguide, and
    the first lens and second lens each is selected from a ball lens, GRIN lens and aspheric lens.

4. The optical component of claim 1 for gain-flattening multiplexed passband signals amplified with optical pump power, wherein the launch port optical waveguide, the bypass port optical waveguide and the output port optical waveguide each is an optical fiber.

5. The optical component of claim 4 for gain-flattening multiplexed passband signals amplified with optical pump power, wherein the launch port optical waveguide and the bypass port optical waveguide are together held in a dual fiber ferrule fitted to a housing in which both the thin film demux filter and the gain-flattening filter are mounted.

6. The optical component of claim 1 for gain-flattening multiplexed passband signals amplified with optical pump power, wherein the bypass port optical waveguide is operative to attenuate signals in the passband wavelength range.

7. The optical component of claim 1 for gain-flattening multiplexed passband signals amplified with optical pump power, wherein the thin film demux filter is operative to pass multiplexed passband signals in the C-band, L-band, S-band, other communication band or a combination of communication bands and to reflect optical pump power of nominal 980 nm wavelength.

8. An optical component for gain-flattening multiplexed passband signals amplified with optical pump power, comprising:
    a launch port optical waveguide operative to communicate multiplexed passband signals in a passband wavelength range and optical pump power in a different wavelength range;
    a thin film demux filter oriented to receive combined multiplexed passband signals and optical pump power from the launch port optical waveguide, and operative to pass the multiplexed passband signals and to reflect the optical pump power;
    a bypass port optical waveguide operative and oriented to receive and carry optical pump power reflected by the demux filter;
    a gain-flattening filter positioned to receive from the thin film demux filter and operative to pass the multiplexed passband signals with a desired attenuation profile for gain-flattening; and
    an output port optical waveguide oriented to receive and operative to carry at least multiplexed passband signals passed by the gain-flattening filter,
    wherein:
    the thin film demux filter, end-surface of the launch port optical waveguide, and end surface of the bypass port optical waveguide each is non-orthogonal to the direction of the optical path of the passband signals, and
    the gain-flattening filter and end-surface of the output port optical waveguide each is non-orthogonal to the direction of the optical path of the passband signals.

9. An optical component for gain-flattening multiplexed passband signals amplified with optical pump power, comprising:
    a launch port optical waveguide operative to communicate multiplexed passband signals in a passband wavelength range and optical pump power in a different wavelength range;
    a thin film demux filter oriented to receive combined multiplexed passband signals and optical pump power from the launch port optical waveguide, and operative to pass the multiplexed assband signals and to reflect the optical pump power;
    a bypass port optical waveguide operative and oriented to receive and carry optical pump power reflected by the demux filter;
    a gain-flattening filter positioned to receive from the thin film demux filter and operative to pass the multiplexed assband signals with a desired attenuation profile for gain-flattening; and
    an output port optical waveguide oriented to receive and operative to carry at least multiplexed passband signals passed by the gain-flattening filter,
    and further comprising:
    a housing in which both the thin film demux filter and the gain-flattening filter are mounted;
    a first lens positioned between the launch port optical waveguide and the thin film demux filter, operative (i) to project combined multiplexed passband signals and optical pump power launched from the launch port optical waveguide to the thin film demux filter and (ii)

to focus optical pump power reflected by the thin film demux filter to the output port optical waveguide; and a second lens positioned between the gain-flattening filter and the output port optical waveguide, operative to focus multiplexed passband signals passed by the gain-flattening filter to the output port optical waveguide;

wherein:

the first lens and second lens each is selected from a ball lens, GRIN lens and aspheric lens, the launch port optical waveguide, the bypass port optical waveguide each is an optical fiber held together in a dual fiber ferrule fitted to the housing, the thin film demux filter, optical fiber end-surface of the launch port optical waveguide and optical fiber end surface of the bypass port optical waveguide each is non-orthogonal to the direction of passband signals, the output port optical waveguide is an optical fiber held in a ferrule fitted to the housing, the gain-flattening filter and optical fiber end-surface of the output port optical waveguide each is non-orthogonal to the direction of passband signals, and the optical fiber end surfaces and lenses have anti-reflective coatings.

10. The optical component of claim 1 for gain-flattening multiplexed passband signals amplified with optical pump power, wherein the thin film demux filter is on a first surface of an optical substrate, and the gain-flattening filter is on a second surface of the optical substrate.

11. The optical component of claim 10 for gain-flattening multiplexed passband signals amplified with optical pump power, wherein the optical substrate is wedged, the first surface and second surface being at an angle to each other of up to 1° off parallel.

12. The optical component of claim 10 for gain-flattening multiplexed passband signals amplified with optical pump power, further comprising a multiplexer optically coupling the bypass port optical waveguide and the output port optical waveguide to re-combine optical pump power reflected by the demux filter with multiplexed passband signals passed by the gain-flattening filter.

13. The optical component of claim 1 for gain-flattening multiplexed passband signals amplified with optical pump power, wherein the thin film demux filter is on a first surface of a first optical substrate, and the gain-flattening filter is on a second surface of a second optical substrate.

14. An optical component for gain-flattening multiplexed passband signals amplified with optical pump power, comprising:

a launch port optical waveguide operative to communicate multiplexed passband signals in a passband wavelength range and optical pump power in a different wavelength range;

a thin film demux filter oriented to receive combined multiplexed passband signals and optical pump power from the launch port optical waveguide, and operative to pass the multiplexed passband signals and to reflect the optical pump power;

a bypass port optical waveguide operative and oriented to receive and carry optical pump power reflected by the demux filter;

a gain-flattening filter positioned to receive from the thin film demux filter and operative to pass the multiplexed passband signals with a desired attenuation profile for gain-flattening; and an output port optical waveguide oriented to receive and operative to carry at least multiplexed passband signals passed by the gain-flattening filter, wherein the thin film demux filter is on a first surface of an optical substrate and faces the launch port optical waveguide, and the gain-flattening filter is on a second surface of the optical substrate and faces the output port optical waveguide, the first surface and second surface being non-parallel to each other at an angle of up to 1°, and further comprising:

a housing in which the optical substrate carrying both the thin film demux filter and the gain-flattening filter is mounted;

a first lens positioned between the launch port optical waveguide and the thin film demux filter, operative (i) to project combined multiplexed passband signals and optical pump power launched from the launch port optical waveguide to the thin film demux filter and (ii) to focus optical pump power reflected by the thin film demux filter to the output port optical waveguide; and a second lens positioned between the gain-flattening filter and the output port optical waveguide, operative to focus multiplexed passband signals passed by the gain-flattening filter to the output port optical waveguide;

and wherein:

the first lens and second lens each is selected from a ball lens, GRIN lens and aspheric lens, the launch port optical waveguide and the bypass port optical waveguide each is an optical fiber held together in a dual fiber ferrule fitted to the housing, the thin film demux filter, optical fiber end-surface of the launch port optical waveguide and optical fiber end surface of the bypass port optical waveguide each is non-orthogonal to the direction of passband signals, the output port optical waveguide is an optical fiber held in a ferrule fitted to the housing, the gain-flattening filter is non-parallel to the optical fiber end-surface of the output port optical waveguide, and the optical fiber end surfaces and lenses have anti-reflective coatings.

15. The optical component of claim 1 for gain-flattening multiplexed passband signals amplified with optical pump power, wherein:

the thin film demux filter is on a reflector surface of a first optical substrate, and the gain-flattening filter is on a second optical substrate, and the second optical substrate has an output surface which faces the output port optical waveguide and is operative to reflect the optical pump power, further comprising:

an isolator, positioned in an optical path between the first optical substrate and the second optical substrate, the isolator being operative to provide high return loss for pump power, wherein a second surface of the second optical substrate faces the isolator; and a pump power optical waveguide operative to carry optical pump power and oriented to launch optical pump power toward the output surface of the second optical substrate, wherein the output port optical waveguide, the pump power optical waveguide and the output surface of the second optical substrate are oriented to reflect pump power from the pump power optical waveguide to the output port optical waveguide.

16. An optical component for gain-flattening multiplexed passband signals amplified with optical pump power, comprising:

a launch port optical waveguide operative to communicate multiplexed passband signals in a passband wavelength range and optical pump power in a different wavelength range;

a thin film demux filter oriented to receive combined multiplexed passband signals and optical pump power from the launch port optical waveguide, and operative to pass the multiplexed passband signals and to reflect the optical pump power;

a bypass port optical waveguide operative and oriented to receive and carry optical pump power reflected by the demux filter;

a gain-flattening filter positioned to receive from the thin film demux filter and operative to pass the multiplexed passband signals with a desired attenuation profile for gain-flattening; and an output port optical waveguide oriented to receive and operative to carry at least multiplexed passband signals passed by the gain-flattening filter;

wherein:

the thin film demux filter is on a reflector surface of a first optical substrate, and the gain-flattening filter is on a second optical substrate, and the second optical substrate has an output surface which faces the output port optical waveguide and is operative to reflect the optical pump power, and further comprising:

an isolator, positioned in an optical path between the first optical substrate and the second optical substrate, the isolator being operative to provide high return loss for pump power, wherein a second surface of the second optical substrate faces the isolator; and a pump power optical waveguide operative to carry optical pump power and oriented to launch optical pump power toward the output surface of the second optical substrate, wherein the output port optical waveguide, the pump power optical waveguide and the output surface of the second optical substrate are oriented to reflect pump power from the pump power optical waveguide to the output port optical waveguide;

and wherein:

the reflector surface of the first optical substrate faces the launch port optical waveguide, and an oppositely facing second surface of the first optical substrate faces the isolator, the first optical substrate being wedged such that the reflector surface and the oppositely facing second surface are non-parallel to each other at an angle of up to 1° off parallel.

17. A optical component for gain-flattening multiplexed passband signals amplified with optical pump power, comprising:

a launch port optical waveguide operative to communicate multiplexed passband signals in a passband wavelength range and optical pump power in a different wavelength range;

a thin film demux filter oriented to receive combined multiplexed passband signals and optical pump power from the launch port optical waveguide, and operative to pass the multiplexed passband signals and to reflect the optical pump power;

a bypass port optical waveguide operative and oriented to receive and carry optical pump power reflected by the demux filter;

a gain-flattening filter positioned to receive from the thin film demux filter and operative to pass the multiplexed assband signals with a desired attenuation profile for gain-flattening; and an output port optical waveguide oriented to receive and operative to carry at least multiplexed assband signals passed by the gain-flattening filter;

wherein:

the thin film demux filter is on a reflector surface of a first optical substrate, and the gain-flattening filter is on a second optical substrate, and the second optical substrate has an output surface which faces the output port optical waveguide and is operative to reflect the optical pump power, and further comprising:

an isolator, positioned in an optical path between the first optical substrate and the second optical substrate, the isolator being operative to provide high return loss for pump power, wherein a second surface of the second optical substrate faces the isolator; and a pump power optical waveguide operative to carry optical pump power and oriented to launch optical pump power toward the output surface of the second optical substrate, wherein the output port optical waveguide, the pump power optical waveguide and the output surface of the second optical substrate are oriented to reflect pump power from the pump power optical waveguide to the output port optical waveguide;

and wherein:

the gain-flattening filter is at the output surface of the second optical substrate, whereby the output surface of the second optical substrate is both reflective of the optical pump power and operative to provide a desired attenuation profile to multiplexed passband signals in the passband wavelength range; and an oppositely facing second surface of the second optical substrate faces the isolator, the second optical substrate being wedged such that the output surface and the oppositely facing second surface of the second optical substrate are non-parallel to each other at an angle of up to 1° off parallel.

18. The optical component of claim 15 for gain-flattening multiplexed passband signals amplified with optical pump power, wherein:

the gain-flattening filter is at an oppositely facing second surface of the second optical substrate, which faces the isolator; and the second optical substrate is wedged such that the output surface and the oppositely facing second surface of the second optical substrate are non-parallel to each other at an angle of up to 1° off parallel.

19. An optical component for gain-flattening multiplexed passband signals amplified with optical pump power, comprising:

a launch port optical waveguide operative to communicate multiplexed passband signals in a passband wavelength range and optical pump power in a different wavelength range;

a thin film demux filter oriented to receive combined multiplexed passband signals and optical pump power from the launch port optical waveguide, and operative to pass the multiplexed passband signals and to reflect the optical pump power;

a bypass port optical waveguide operative and oriented to receive and carry optical pump power reflected by the demux filter;

a gain-flattening filter positioned to receive from the thin film demux filter and operative to pass the multiplexed passband signals with a desired attenuation profile for gain-flattening; and an output port optical waveguide oriented to receive and operative to carry at least multiplexed passband signals passed by the gain-flattening filter;

wherein:

the thin film demux filter is on a reflector surface of a first optical substrate, and the gain-flattening filter is on a second optical substrate, and the second optical substrate has an output surface which faces the output port optical waveguide and is operative to reflect the optical pump power, and further comprising:

an isolator, positioned in an optical path between the first optical substrate and the second optical substrate, the isolator being operative to provide high return loss for pump power, wherein a second surface of the second optical substrate faces the isolator;

a pump power optical waveuide operative to carry optical pump power and oriented to launch optical pump power toward the output surface of the second optical substrate, wherein the output port optical waveguide, the pump power optical waveguide and the output surface of the second optical substrate are oriented to reflect pump power from the pump power optical waveguide to the output port optical waveguide;

a housing in which the first and second optical substrates and the isolator are mounted;

a first lens positioned between (i) the launch port optical waveguide and bypass port optical waveguide and (ii) the reflector surface of the first optical substrate, the first lens being operative to focus:

combined multiplexed passband signals and optical pump power from the launch port optical waveguide to the demux filter, and optical pump power reflected by the demux filter to the bypass port optical waveguide; and a second lens positioned between (i) the second optical substrate and (ii) the output port optical waveguide and pump power optical waveguide, the second lens being operative;

to focus multiplexed passband signals passed by the gain-flattening filter to the output port optical waveguide, to project optical pump power from the pump power optical waveguide to the output surface of the second optical substrate, and to focus optical pump power reflected by the output surface of the second optical substrate to the output port optical waveguide;

and wherein:

the first lens and second lens each is selected from a ball lens, GRIN lens and aspheric lens, the launch port optical waveguide and the bypass port optical waveguide each is an optical fiber held together in a dual fiber ferrule fitted to the housing, the thin film demux filter, optical fiber end-surface of the launch port optical waveguide and optical fiber end surface of the bypass port optical waveguide each is non-orthogonal to the direction of passband signals, the output port optical waveguide and pump power optical waveguide each is an optical fiber held together in a dual fiber ferrule fitted to the housing, the output surface of the second optical substrate is non-parallel to the optical fiber end-surface of the output port optical waveguide and the optical fiber end-surface of the pump power optical waveguide, and at least the optical fiber end surface and, lenses have anti-reflective coatings.

20. The optical component of claim 15 for gain-flattening multiplexed passband signals amplified with optical pump power, wherein the bypass port optical waveguide and the pump power optical waveguide are portions of the same optical fiber pathway, optical pump power reflected by the thin film demux filter to the bypass port optical waveguide being communicated to the pump power optical waveguide to be reflected by the output surface of the second optical substrate to the output port optical waveguide.

21. The optical component of claim 20 for gain-flattening multiplexed passband signals amplified with optical pump power, wherein the optical fiber pathway is an uninterrupted length of optical fiber.

22. The optical component of claim 20 for gain-flattening multiplexed passband signals amplified with optical pump power, wherein the optical fiber pathway comprises a splice multiplexer/demultiplexer operative to provide further isolation of multiplexed passband signals from the optical pump power carried by the optical fiber pathway.

23. An optical amplifier for amplifying multiplexed passband signals with optical pump power, comprising, optically coupled in the following sequence along an optical path:

a first gain stage operative to receive multiplexed passband signals in a passband wavelength range combined with optical pump power in a different wavelength range and to amplify and pass the multiplexed passband signals combined with optical pump power;

an optical gain-flattening component operative to receive from the first gain stage amplified multiplexed passband signals combined with optical pump power and to provide a desired attenuation profile to the multiplexed passband signals for gain-flattening; and a second gain stage operative to receive the multiplexed passband signals from the optical gain-flattening component and optical pump power to further amplify the multiplexed passband signals, the attenuation profile provided by the optical gain-flattening component compensating for uneven amplification of the first and second gain stages, wherein the optical gain-flattening component comprises:

a launch port optical waveguide operative to carry the multiplexed passband signals and the optical pump power;

a thin film demux filter oriented to receive the combined multiplexed passband signals and optical pump power from the launch port optical waveguide, and operative to pass the multiplexed passband signals and to reflect the optical pump power;

a bypass port optical waveguide operative and oriented to receive and carry the optical pump power reflected by the demux filter;

a gain-flattening filter positioned to receive and operative to pass multiplexed passband signals in the passband wavelength range with a desired attenuation profile for gain-flattening; and an output port optical waveguide oriented to receive at least multiplexed passband signals passed by the gain-flattening filter and operative to pass them to the second gain stage.

24. The optical amplifier of claim 23 for amplifying multiplexed passband signals with optical pump power, further comprising an isolator between the optical gain-flattening component and the second gain stage, and an isolator following the second gain stage.

25. The optical amplifier of claim 23 for amplifying multiplexed passband signals with optical pump power, wherein the first and second gain stage each comprises a length of doped optical fiber.

26. The optical amplifier of claim 25 for amplifying multiplexed passband signals with optical pump power, wherein the first and second gain stage each comprises an erbium-doped fiber amplifier.

27. The optical amplifier of claim 23 for amplifying multiplexed passband signals with optical pump power, wherein the multiplexed passband signals are in the C-band and the optical pump power has a nominal 980 nm wavelength.

28. The optical amplifier of claim 23 for amplifying multiplexed passband signals with optical pump power, further comprising a source of optical pump power.

29. The optical amplifier of claim 28 for amplifying multiplexed passband signals with optical pump power, wherein the source of optical pump power is a pump laser.

* * * * *